(12) United States Patent
Keren

(10) Patent No.: US 12,639,734 B2
(45) Date of Patent: May 26, 2026

(54) SYSTEM, DEVICE, AND METHOD OF PROTECTED ELECTRONIC COMMERCE AND ELECTRONIC FINANCIAL TRANSACTIONS

(71) Applicant: BRANDSHIELD LTD., Ramat HaSharon (IL)

(72) Inventor: Yoav Keren, Ramat Hasharon (IL)

(73) Assignee: BRANDSHIELD LTD., Ramat Hasharon (IL)

( * ) Notice: Subject to any disclaimer, the term of this patent is extended or adjusted under 35 U.S.C. 154(b) by 638 days.

(21) Appl. No.: 16/765,873

(22) PCT Filed: Nov. 27, 2018

(86) PCT No.: PCT/IL2018/051287
§ 371 (c)(1),
(2) Date: May 21, 2020

(87) PCT Pub. No.: WO2019/106659
PCT Pub. Date: Jun. 6, 2019

(65) Prior Publication Data
US 2020/0311790 A1     Oct. 1, 2020

Related U.S. Application Data

(63) Continuation-in-part of application No. 14/782,791, filed as application No. PCT/IB2014/060577 on Apr. 9, 2014, now abandoned.
(Continued)

(51) Int. Cl.
*G06Q 30/06* (2023.01)
*G06F 16/23* (2019.01)
(Continued)

(52) U.S. Cl.
CPC ..... *G06Q 30/0609* (2013.01); *G06F 16/2379* (2019.01); *G06F 40/20* (2020.01);
(Continued)

(58) Field of Classification Search
None
See application file for complete search history.

(56) References Cited

U.S. PATENT DOCUMENTS

2006/0031385 A1     2/2006 Westerdal
2006/0069697 A1*    3/2006 Shraim ............... H04L 63/1441
                                                                707/999.102
(Continued)

FOREIGN PATENT DOCUMENTS

JP          2006285844 A      10/2006
JP          2009500729 A       1/2009
(Continued)

OTHER PUBLICATIONS

Maranzato, R., et al., "Feature Extraction for Fraud Detection in Electronic Marketplaces", 2009 Latin American Web Congress, 2009 IEEE. (Year: 2009).*
(Continued)

*Primary Examiner* — Clay C Lee
(74) *Attorney, Agent, or Firm* — FisherBroyles, LLP; Roger L. Browdy; James E. Mrose

(57)     ABSTRACT
System, device, and method of protected electronic commerce and electronic financial transactions. A method includes: analyzing (i) content of an online destination that sells an asset to an end-user, and (ii) data about ownership in the online destination, and (iii) meta-data about that content; and determining that an offering to sell that asset to the end-user is fraudulent. The system further provides digital tokens or crypto-currency, that end-users should pay in order to submit a user-report about a possible scam. The
(Continued)

collected crypto-currency tokens are used by the system, to reward a user that submitted a scam report that turned out to be correct, to fund operations of a fraud-prevention entity, to fund guarantee payments to defrauded end-users, and for other purposes. The system generates authenticity stamps for online venues and for crypto-currency wallets that are determined to be legitimate.

15 Claims, 1 Drawing Sheet

Related U.S. Application Data

(60) Provisional application No. 62/591,339, filed on Nov. 28, 2017, provisional application No. 61/810,742, filed on Apr. 11, 2013.

(51) Int. Cl.

| | | |
|---|---|---|
| *G06F 40/20* | (2020.01) | |
| *G06Q 10/107* | (2023.01) | |
| *G06Q 20/06* | (2012.01) | |
| *G06Q 20/38* | (2012.01) | |
| *G06Q 30/018* | (2023.01) | |
| *G06Q 30/02* | (2023.01) | |
| *G06Q 30/0207* | (2023.01) | |
| *G06Q 30/0217* | (2023.01) | |
| *G06Q 30/0282* | (2023.01) | |
| *G06Q 30/0601* | (2023.01) | |
| *G06Q 50/18* | (2012.01) | |
| *G06Q 50/26* | (2012.01) | |

(52) U.S. Cl.
CPC ....... *G06Q 10/107* (2013.01); *G06Q 20/0655* (2013.01); *G06Q 20/389* (2013.01); *G06Q 30/0185* (2013.01); *G06Q 30/0215* (2013.01); *G06Q 30/0217* (2013.01); *G06Q 30/0282* (2013.01); *G06Q 30/0613* (2013.01); *G06Q 30/0623* (2013.01); *G06Q 50/184* (2013.01); *G06Q 50/265* (2013.01)

(56) References Cited

U.S. PATENT DOCUMENTS

| | | | |
|---|---|---|---|
| 2006/0253458 A1 | 11/2006 | Dixon et al. | |
| 2008/0162265 A1* | 7/2008 | Sundaresan ........... | H04L 67/306 |
| | | | 707/781 |
| 2011/0112869 A1 | 5/2011 | Greak | |
| 2012/0023566 A1 | 1/2012 | Waterson et al. | |
| 2012/0240236 A1 | 9/2012 | Wyatt et al. | |
| 2013/0311348 A1* | 11/2013 | Samid .................. | G06Q 20/381 |
| | | | 705/37 |
| 2014/0079297 A1 | 3/2014 | Tadayon et al. | |
| 2014/0280952 A1 | 9/2014 | Shear et al. | |
| 2015/0193768 A1 | 7/2015 | Douglas et al. | |
| 2016/0055490 A1 | 2/2016 | Keren | |
| 2016/0162873 A1* | 6/2016 | Zhou ....................... | G06F 3/002 |
| | | | 705/65 |
| 2017/0324738 A1 | 11/2017 | Hari | |
| 2018/0117447 A1* | 5/2018 | Tran .................. | G09B 19/0038 |

FOREIGN PATENT DOCUMENTS

| | | | | |
|---|---|---|---|---|
| JP | 2009110334 A | 5/2009 | | |
| JP | 2015187779 A | 10/2015 | | |
| JP | 2016126615 A | 7/2016 | | |
| JP | 2016524202 A | 8/2016 | | |
| JP | 2017204707 A | 11/2017 | | |
| WO | WO-0184906 A2 * | 11/2001 | ............. | G06Q 20/02 |
| WO | 2005091107 A1 | 9/2005 | | |
| WO | 2007/089943 A2 | 8/2007 | | |
| WO | 2010/042983 A1 | 4/2010 | | |
| WO | WO-2012058338 A1 * | 5/2012 | ......... | G06Q 20/3674 |

OTHER PUBLICATIONS

International Search Report in PCT/IL2018/051287, dated Jan. 28, 2019.
Written Opinion of the International Searching Authority in PCT/IL2018/051287, dated Jan. 28, 2019.
Crosby, et al., Blockchain technology: Beyond bitcoin, Applied innovation Review, Issue 2, pp. 6-19, 2016.

* cited by examiner

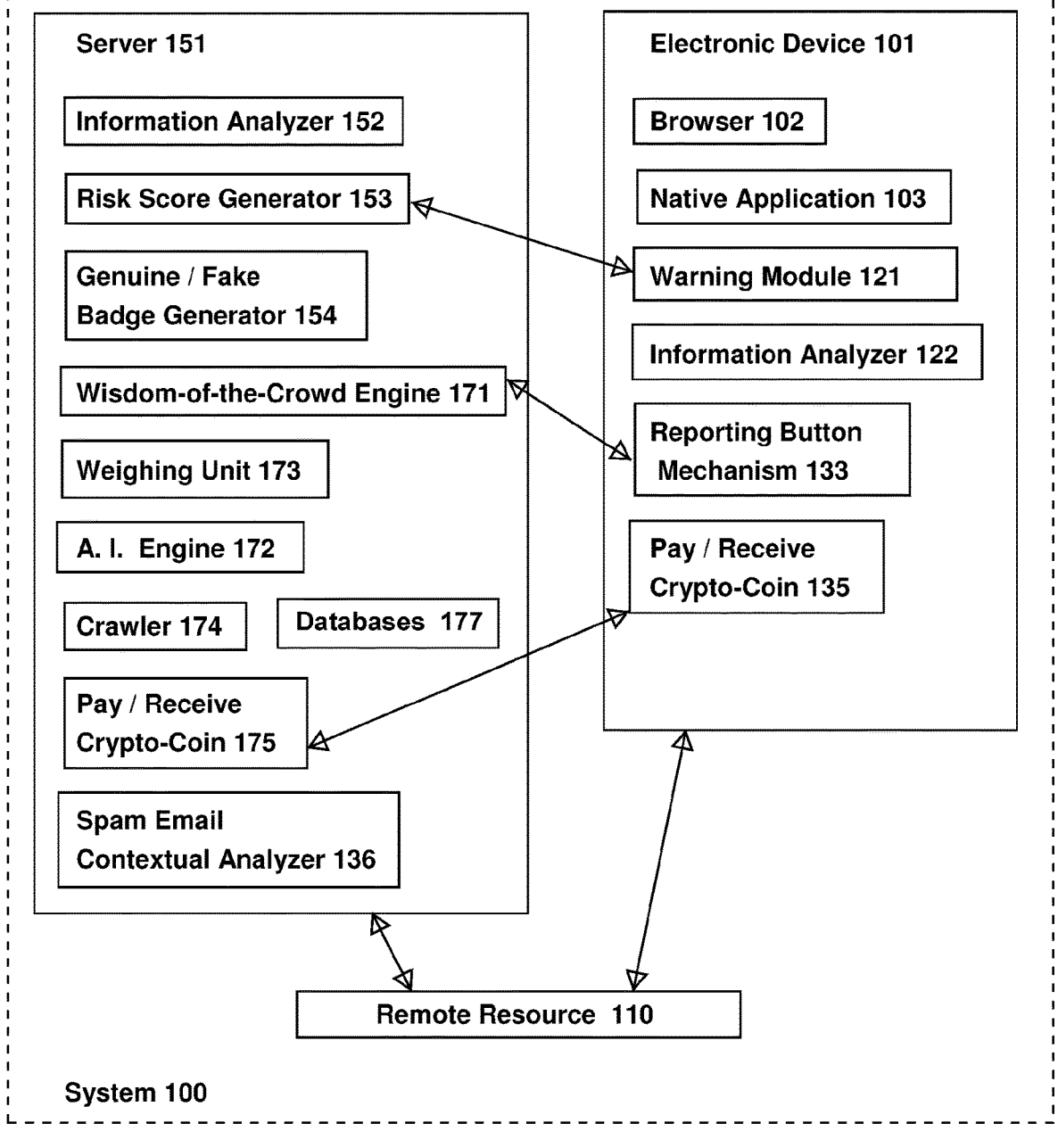

SYSTEM, DEVICE, AND METHOD OF PROTECTED ELECTRONIC COMMERCE AND ELECTRONIC FINANCIAL TRANSACTIONS

CROSS-REFERENCE TO RELATED APPLICATIONS

This patent application is a National Stage of PCT international application number PCT/IL2018/051287, having an international filing date of Nov. 27, 2018, published as international publication WO 2019/106659 A1, which is hereby incorporated by reference in its entirety; which claims benefit and priority from U.S. 62/591,339, filed on Nov. 28, 2017, which is hereby incorporated by reference in its entirety. This patent application is also a Continuation-in-Part (CIP) of U.S. Ser. No. 14/782,791, filed on Oct. 7, 2015, which is hereby incorporated by reference in its entirety; which is a National Stage of PCT international application number PCT/IB2014/060577, having an international filing date of Apr. 9, 2014, published as international publication WO 2014/167516 A1, which is hereby incorporated by reference in its entirety; which claims benefit and priority from U.S. 61/810,742, filed on Apr. 11, 2013, which is hereby incorporated by reference in its entirety.

FIELD

The present invention relates to the field of electronic commerce and electronic financial transactions.

BACKGROUND

Millions of people worldwide utilize a variety of electronic devices every day. For example, a user may utilize a desktop computer, a laptop computer, a smartphone, or a tablet in order to perform various activities and tasks.

For example, a user may utilize an electronic device to send and receive electronic mail (email), to play games, to browse the Internet, to perform online shopping, to consume digital content, to pay bills, to trade stocks and other securities, to participate in an online auction, to engage in Instant Messaging (IM) and video conferences, or the like.

SUMMARY

Some embodiments of the present invention may comprise systems, devices, and methods that warn a user that a particular product that is offered for sale online is actually (or is certainly, or is most probably, or is estimated to be) a counterfeit product or a fake product or an imitation product or a non-genuine product; or that warn a user that an online venue that is visited or engaged by the user (e.g., a website, a web-page, a mobile "app" or application) is a Fraudulent online venue in its nature (e.g., utilized by its owner to commit fraud or scams or to infringe Intellectual Property (IP) rights or to sell counterfeit goods or counterfeit services).

Some embodiments of the present invention may utilize "wisdom of the crowd" and/or Artificial Intelligence (AI) in order to generate a Risk Score for a product/service that is offered for sale online, or for a web-page or mobile "app" that can be accessed or used online; or to generate a "Fake"/"Genuine" determination with regard to such product/service or with regard to such web-site or web-page or mobile application.

Some embodiments may generate and present to the user a Certification Stamp that confirms to the user, that a particular destination that the user is visiting (e.g., website, web-page) is indeed offering for sale Genuine products. Optionally, the certification stamps data may be stored using a blockchain based data-set, thereby preventing tampering with such certification data, and/or thereby enabling a user or a web-browser to autonomously check and verify that a Certification Stamp is indeed valid and authentic as being part of such blockchain.

In some embodiments, users may report to a central server regarding websites and web-pages and/or mobile apps, that sell or facilitate the sale of counterfeit products or fake products or that perform fraud activities or piracy activities; and such reporting users may optionally be entitled to receive a reward, such as a crypto-currency payment, from a Bounty Fund that may be established for this purpose by a brand-owner or by a system administrator or by the users themselves.

The present invention may provide other and/or additional advantages and/or benefits.

BRIEF DESCRIPTION OF THE DRAWINGS

FIG. 1 is a schematic illustration of a system, in accordance with some demonstrative embodiments of the present invention.

DETAILED DESCRIPTION OF SOME EMBODIMENTS OF THE PRESENT INVENTION

The present invention comprises a system for online and offline brand protection, which informs users of potential fraud or fake activities or fake products that are offered for sale, and that uses the wisdom of the crowd as a source of information in addition to an automatic analysis of online items and other information.

In the discussion herein, a "Fake Product/Service" may comprise: a counterfeit product, or an imitation product, a non-genuine product or service, or a low-quality product/service or a non-original product/service, an illegal product or unlawful product (e.g., a product that it is unlawful to make or to sell since it infringes on brand name or Intellectual Property (IP) rights), a brand-infringing product or service, a brand-breaching product or service, a non-original product or service, or a product that is not manufactured and/or distributed and/or sold by the legal owner of the brand of that product or by an authorized agent of the legal owner of the brand.

In the discussion herein, an "Online Item" may comprise: a website, a web-page, a social media page or element, an e-commerce marketplace listing, a social media or social network item or element (including but not limited to posts, pages, users, events, groups, etc.), an online advertisement or banner, a mobile application or "app", an application or "app" that can be downloaded from an "app" store or similar location, a blog, a video blog (vlog), a micro-blogging platform (e.g. Twitter), a photo sharing platform (e.g., Pinterest), a multimedia sharing platform (e.g., YouTube), an electronic commerce site or vendor or online merchant (e.g., Amazon), an online auction site (e.g., eBay), an online website for selling new products and/or used products and/or pre-owned products (e.g., Amazon, eBay), or the like.

In the discussion herein a "Fraud Online Item", or a "Fraudulent Online Item", or a "Fraudulent Products Online Item" may comprise: an Online Item that is used to commit or trying to commit fraud, and/or an Online Item that is trying or attempting to steal users credentials (for example, login details to a bank account online) by performing different deceiving methods (e.g., "Phishing"), and/or an online item trying to deceive users to transfer payments not to the intended destination or not to a recipient that the sender intends to transfer the payment, such as performing bank wire transfer to a wrong bank account (e.g., controlled by an attacker), or transferring crypto-currency to a wrong crypto-currency wallet or recipient address, and/or that is used for selling counterfeits, and/or that is used for selling or offering for sale a Fake Product or Fake Service, and/or an online item that is infringing on copyright and/or trademarks and/or service marks and/or other IP rights of a brand owner, and/or an Online Item allowing illegal downloads (piracy) and/or storing pirated digital content and/or serving links or hyperlinks or torrents or pointers to facilitate unlawful download of pirated content, and/or an Online Item providing illegal streaming of video and/or music and/or other content, and/or an Online Item committing or attempting to commit any other IP infringement(s) or breach(es).

In the discussion herein, an "Electronic Device" may comprise: a desktop computer, a laptop computer, a smartphone, a tablet, a smart-watch, a gaming console, a smart television, a cable box, an Internet terminal, an Internet-connected device, an Internet Protocol (IP) connected device, a smart appliance (e.g., a fridge able to perform online purchases of food items), an Internet of Things (IoT) device, or the like.

The Applicants have realized that many Online Items, including those that belong to reputable online merchants (e.g., Amazon, eBay), are repelled with offerings of counterfeit goods or fake products or imitation products; and users are often scammed into purchasing online a product that they believe to be a high-quality genuine product, while in reality they receive a low-quality fake or imitation or non-genuine product. The Applicants have also realized that there are fraudulent activities, many of which are financial fraud, performed through different Online Items.

The Applicants have devised a unique system that enables identification of fake products that are offered for sale online; that warns online users that they are browsing or purchasing a product that is fake or that is most-probably or more-probably fake; and/or that warns online users that they are browsing or visiting an Online Item that is estimated to be used for fraud, for scams or for selling fake products or non-genuine products.

Reference is made to FIG. 1, which is a schematic illustration of a system 100, in accordance with some demonstrative embodiments of the present invention. For example, an end-user is utilizing his Electronic Device 101, having a browser 102 and/or a native application or "app" 103, in order to access or to interact with a Remote Resource 110 (e.g., a website, a web-page, a server that serves content). Electronic Device 101 may comprise a Warning Module 121, which may be implemented for example as a stand-alone application or "app", or as an integral part of a web browser, or as an extension or plug-in or add-on, or other module; such that the Warning Module 121 generates a warning notification to the user, alerting the user that an online product is most-probably fake, or that an Online Item is most-probably fraud-related or fraudulent.

Some embodiments of the present invention may comprise, for example: an application or "app" or a plug-in or browser-extension or a locally installed software or other module or unite, that warns the user that a Product/Service that he intends or considers to buy/order online, or that he currently sees or browses or adds to an online shopping cart, is certainly or is "most probably" a Fake Product/Service; and/or that warns the user that an online item he is currently browsing or viewing or downloading or is consuming or is about to visit or is about to consume or is about to download or is about to browse, is certainly or is "most probably" a Fraud Online Item.

For example, the user installs on his Electronic Device a Warning Module, such as an "app" or application or plug-in or browser-extension or browser add-on or a locally installed software or a native software. The Warning Module is running in the background or in the foreground, particularly when the user is accessing or browsing a web page of any type (website, marketplace listing, social media page, etc.) or using an app (e.g., a dedicated "app" of a vendor or merchant or other entity).

In some embodiments, the Warning Module operates based on a pre-scan of websites or web-pages or "apps" that was performed by a remote server of the system, which pre-scans and pre-analyzes the content, the meta-data, the link and/or the operations that can be performed via such websites or web-pages or "apps", and the data that is collected and analyzed in advance is subsequently utilized when the user browses such destination(s) in real time. In other embodiments, the Warning Module operates based on real-time or near-real-time scanning and/or analysis of the website or web-page or "app" that is actually being visited by the user, immediately within the beginning of such actual visit, or immediately once the user instructs the web browser or his electronic device to access such destination. In still other embodiments, the Warning Module may utilize a combination of pre-scanning and pre-analysis together with real-time scanning and real-time analysis; for example, a real-time scanning and analysis of the destination that is currently being visited, may be performed if that destination was not previously scanned or analyzed by the system.

The Warning Module comprises an Information Analyzer 122 which analyzes one or more parameters of the website or web-page that is being visited (or that may be visited later by users and is now being pre-scanned and pre-analyzed); including, for example, the content, the meta-data, the domain name, the description and the price of the item that is offered for sale, links and/or hyperlinks that are part of the scanned and analyzed web-site or web-page or "app", or the like; performs a Risk Analysis, either locally in the Electronic Device, or remotely (e.g., by sending or transferring information, or a hyperlink, to a remote server 151 or to a cloud-based computing engine that performs the Risk Analysis remotely via an Information Analyzer 152, and utilizes a remote Risk Score Generator 153 to generate and to send back a Risk Score to the Electronic Device). The local Warning Module 121 and/or the remote server 151 comprises a Risk Score Comparator 161 that examines or compares the Risk Score that is the result of the Risk Analysis that was performed, relative to one or more pre-defined threshold values or ranges of values. For example, If the Risk Score is greater than a pre-define threshold, than the Warning Module generates an instant notification to the user, alerting the user with regards to the potential risk level of the web page or app, and particularly, alerting the user to the fact that the Warning Module has estimated or has determined that the product or service that is being browsed or that is being considered for purchase or that is being purchased (e.g., being, or about to be, or was, added to an online shopping cart), is certainly a Fake Product/Service, or is most probably a Fake Product/Service, or is estimate to be a Fake Product/Service.

In some embodiments, instead of or in addition to generating a Risk Score via the Risk Score Generator, the system may utilize a local or a remote Genuine/Fake Badge Generator 154, which may generate a determination whether a particular product is estimated to be Genuine (authentic, original, lawful) or Fake (counterfeit, imitation), and generates accordingly a badge or indicator or label that is displayed or otherwise communicated to the user.

The risk level (or risk score) may be further notified to the user; for example, in ranges or slots such as "High Risk"/"Medium risk"/"low risk", or for example "most probable this is fake/fraud", or "most probably this is genuine", or for example a numerical score (e.g., in the range of 0 to 100, wherein 100 indicates a certainly-fake product, 85 indicates a most-probably fake product, 60 indicates a probably fake product, 15 indicates a most-probably genuine product, and 0 indicates a certainly-genuine product), or a colored score or color coding scheme (e.g., red for risk, yellow for questionable, green for authenticated as genuine), or other suitable indicators.

The Warning Module may also inform the user about approved or pre-approved or verified or pre-verified web-pages or apps. In this case the risk level may be for example "no risk", or "authenticated website", etc.

In a demonstrative example, user Adam is utilizing his laptop in order to browse for a Wireless Controller for Sony PlayStation console. When user Adam browses the online store of Sony.com, the Warning Module may present a notification of "no risk" or "certainly genuine product". When user Adam browses the online store of Sony.co.uk, the Warning Module may similarly present a notification of "no risk" or "certainly genuine product". However, when user Adam browses a web-site having the domain name of "Cheap-Sony-Items.com", which for example is operated by an un-identified party, and/or sells products at very low prices (e.g., below a threshold price value; or, at least K percent cheaper relative to a vendor that is known to be a genuine vendor of genuine products, such as "Sony.com" itself in this example), the Warning Module may generate and present a notification of "High Risk" or "Most Probably Fake Product". Furthermore, when user Adam browses a reputable e-commerce website, such as Amazon or eBay, the Warning Module may still generate a "High Risk"/"Most Probably Fake Product" notification; for example, if user Adam is browsing an eBay listing in which the seller "Cheap-Sony-Items-From-China" is selling that Joystick for a price of 4 dollars (e.g., when the Manufacturer Suggested Retail Price (MSRP) is 70 dollars), or if that seller is a third-part seller on the Amazon Marketplace with a similar price.

Once a user accesses the web page or app, the Warning Module (e.g., which runs in the background) automatically checks and/or analyzes the relevant information, including the web-page URL or the app identifier, and/or compares the information for matches in a Database of genuine providers and/or Database of fake providers and/or other databases, which may be local to the electronic device and/or may be remote (e.g., cloud-computing database); and such databases may comprise pre-analyzed and pre-scored information about various products, services, websites, web-pages, domains, apps, or other elements. For demonstrative purposes, Databases 177 are shown as part of server 151, although they may reside in a different machine, or they may be local to Electronic Device 101, or they may be partially local and partially remote.

The Warning Module may present the risk level or risk score in different ways. For example, it may show the risk level in the toolbar of a browser, and/or it may generate a popup window or screen or tab or message that includes a warning (or an authentication message) about the web-page or about the product/service that is about to be purchased, or it may show the risk score in a separate window (e.g., on a mobile phone in a separate app, or on a PC or laptop in a separate running software), or the like.

The Risk Analysis may be based, in whole or in part, or may utilize, a "wisdom of the crowd" engine 171 or sub-system. The crowd may be, for example: (a) an indication that One user, or Several users, submitted about a Fake Product/Service or a Possibly Fake Product/Service that is being offered for sale; (b) An indication that One user, or Several users, submitted about a Fraud Online Item or Possibly Fraud Online Item; (c) Information from the brand-owner or its agent (e.g., an organization, a company, a person, or other entity) or from a representative of the brand owner (e.g., an employee, an IP manager, a brand manager), that indicates a Fake Product/Service or Possibly Fake Product/Service that is being offered for sale (e.g., with the particular hyperlink to the relevant web-page or app), or that indicates a Fraud Online Item or Possibly Fraud Online Item; (d) input from a dedicated analyst that reviews the initial analysis of an online brand protection system (as described below), wherein such analyst may be a human analyst or may be a machine running a Machine Learning (ML) algorithm or utilizing a Neural Network (NN) to make such determinations; (e) any combination of the above and/or other sources of information.

The system further receives or collects from users various "user indications" or "user submissions", or "Genuine Product votes" or "Fake Product votes", that indicate that a particular product/service is or may be fake and/or that an online item may be fraud or appears to be Fake or appears to be fraudulent or is selling Fake Products/Services. The system aggregates such indications or submissions or votes, optionally by using a Weighing Unit 172 or weighting mechanism (e.g., a vote or a submission from certain users, may have an increased weight relative to votes of other users; for example, a vote of a Verified Buyer that already purchased the product and votes that it is Fake, may be assigned a greater weight than the weight assigned to a vote or a submission of a "fresh" user that has just performed his first submission and is not a verified buyer). Based on the aggregated data, the system generates a "possibly fake"/"possibly fraud" score or indicator, or other type of a potential Risk Score (or, an Authenticity indicator) that may be used by the Warning Module to inform users about a possible risk of a Fake Product/Service or a Fraud Online Item.

The Risk Analysis may be based on, or may comprise, an automatic analysis made by an Online Brand Protection system that utilizes an Artificial Intelligence (AI) engine 173 and big data, that analyzes different web metrics to indicate a potential risk score for the Online Item being analyzed, and/or to determine if a product/service that is offered for sale is more-probably Genuine or Fake.

The web metrics that are analyzed by the system may include, but are not limited to, content and keywords, web-page elements, Search Engine Optimization (SEO) data, domain names in all TLDs (as well as the use of the brand name, or a variation of the brand name or a typographical error of the brand name in the domain name), hosting provider, DNS data, registrar data, traffic and statistics, traffic analytics, search engine results, technologies and structures of the website/app, meta-tags and the coding utilized, programming languages used, use of logo and/or copyrighted pictures and/or trademarks, inbound and outbound links, engagement in social media or linking from the website to social media or vice versa, amount and/or types of listings of a seller on a marketplace, votes or scores or reviews or ratings that users and/or buyers and/or verified buyers have submitted with regard to a web-page or a web-site or a particular product/service.

The system automatically analyzes the different relevant metrics based on the online item being analyzed, whether it is a website, ecommerce marketplace listing, social media item, online advertisement, mobile app, or the like.

Based on the analysis of the different metrics, the system automatically creates a score or a rating of the potential risk of the online item of being a Fraud Online Item, or a score indicator how Genuine or Fake the system estimates the product/item to be.

When the user accesses an Online Item that has been analyzed by the system, the Warning Module automatically notifies the user that the Online Item is potentially or probably a Fraud Online Item, and/or that the product/service the user is about to order is potentially a Fake Product/Service, and/or the risk level of the Online Item; or conversely, that the product/service is determined to be Genuine or non-fake.

The above-mentioned operations may be based, in whole or in part, on "wisdom of the crowd" as described above and/or its aggregation as described above, in combination with an automatic analysis made by an Online Brand Protection system as described above; some or all of these modalities may be aggregated, or may be used in combination, in order to generate the Risk Score or the Fake/Genuine indicator.

In some embodiments, the system may use the wisdom of the crowd, or the "crowd wisdom" or an aggregated wisdom from a plurality of users, or an aggregated insight from a plurality of users, as an additional parameter in the analysis of the potential risk level or in generating the risk score; and the crowd wisdom is then used as part of the analysis and AI to prioritize and/or score the Online Item.

In some embodiments, the crowd wisdom is utilized as an additional layer of information added to the autonomous or automatic analysis of the system, which allows validating the results of the automatic analysis. In other embodiments, the AI analysis may be utilized to validate or re-confirm the indicators that the aggregated crowd wisdom had provided. In yet other embodiments, a weighted formula may be utilized, such that both AI analysis of various information and parameters, as well as the aggregated wisdom of the crowd, are used in combination in order to generate the Risk Score or the Fake/Genuine indicator.

The system may utilize an indication or a link or a user submission, or other sources of information, in order to operate a Crawler 174 to actively crawl various web-pages and Online Items that are not yet known to the system (e.g., were not yet crawled or analyzed, or are not already in the system's database), and in order to collect information about it and store the information in Databases 177, and analyze its web metrics, and then generate a risk score accordingly.

Some embodiments of the invention may provide a dedicated Reporting Button (or other Reporting GUI Element) in a web browser, or in a mobile app, or in a shopping app (such as, Amazon app, eBay app), which allows the user to easily and rapidly submit an indication of a Fake Product/Service and/or to submit an indication of a Fraud Online Item. For example, a Reporting Button Mechanism 133 may be installed in Electronic Device 101, as part of a browser or as part of a mobile app, or as an extension or plug-in or add-on to them, or as a stand-alone application.

For example, when the user is browsing a certain online item, whether it is on a website, or an ecommerce marketplace, a social media platform, a mobile app, or the like, and he believes that a particular online item may be a Fraud Online Item, or that the product/service he is about to order (or that is offered for sale) may be Fake Product/Service, then the user can press or tap the dedicated Reporting Button of other GUI element (which may be called, for example, "report possible fraud", or "report that this product looks to me suspicious or fake", etc.). The button will then initiate a function that reports the Online Item to a central system of the present invention, or to another online brand protection system.

The user may press or engage that Reporting Button or GUI element, not only when she has a suspicion of a fraud/fake activity or item or product, but also after the user has actually learnt that this is a Fraud Online Item or a Fake Product/Service; for example, if the user had already ordered a certain product from a particular website and after receiving it, the user finds out that the product is a counterfeit, then the user can utilize the Button to report the website and/or that particular Fake Product to the system of the present invention.

In some embodiments, the Reporting Button (or other GUI element used for reporting) may operate in combination with a data-entry field, in which the user may enter (for example, by doing cut and paste from history of browsing) a URL of a suspicious Online Item, or by entering a SKU number or product number or other unique identifier of the suspicious product or the fake product, or an identifier of its title or price or features as presented online (e.g., a uniquely very low price of the suspicious item, may be used as an identifier of the fake product).

The Reporting Button may similarly be used also to report a legitimate Online Items, ant may have multiple options, for example: "This Website is Fraud" and "This Website is legitimate", or the like.

The present invention may further utilize blockchain technology and/or crypto-currency technology in order to prevent or reduce online fraud and/or "phishing" attacks and/or cyber-attacks and cyber-scams and/or counterfeit sales. For example, a crypto-currency is a digital token based on blockchain technology; and the activity in relation to crypto-currency may be, for example, websites acting as a digital wallet for crypto-currency, online exchanges for crypto-currency, websites or programs used for Initial Coin Offering (ICO), websites providing information about crypto-currency and/or their current or historical rates, websites providing products or services using crypto-currency, websites providing or describing securities or futures or derivatives of crypto-currency, or the like.

The present invention may enable integration of crypto-currency with the "crowd-wisdom" (the submissions of indications from the crowd about potential Fraud Online Items and/or Fake Products/Services). For example, a user may Pay a crypto-coin to submit such information; and/or, a user may Receive a crypto-coin (optionally: a greater amount) if his submission is corroborated with (or is confirmed by) other indications or fakeness or fraud (such as, by an automatic analysis by an AI system as described above), and/or with other submissions by other users.

The user may accumulate "points" for submitting an Online Item that is totally unknown to the system (e.g., a web-page that was never crawled and that appears to offer a Fake Product/Service for sale), and/or for submitting an Online Item that was already known to the system (e.g., was crawled in the past but was not necessarily flagged by the AI system as containing Fake Products until the human user submitted his reporting). Optionally, a user may lose points or may pay crypto-coins in case he submitted an Online Item as suspicious but in fact it is a legitimate Online Item.

When the user Receives a crypto-coin for his submission, he may be compensated more in case he was the first one to submit the Online Item, and/or if the user is more active in submissions; for example, there may be levels of activities, that when the user reaches them, he will be compensated more for verified submission(s) (e.g., an increased compensation level once the user has submitted at least N Online Items that were indeed found to be Fraud Online Items).

The crypto-currency payments between the system and its users may be performed, for example, via a Pay/Receive Crypto Coin Unit 135 installed in the Electronic Device 101, and via a Pay/Receive Crypto Coin Unit 175 installed in the remote server 151.

The compensation for the users may come from different resources; for example, from a fund or a "bounty" created by a brand owner (an organization, a company, a person, or the like), and/or a fund created by a contribution of other users of the app or a plug-in or browser-extension or a locally installed software, and/or a fund created by other users who Pay to perform a submission, or by an administrator of the system of the present invention who provides to brand-owners a service of brand protection, or the like.

Some embodiments may further utilize the "wisdom of the crowd" as described above, for analysis of Spam (junk email, junk messages, unwanted email, unwanted messages) in order to detect fake products and/or Fraud Online Items. A conventional Spam Filter receives a user indication of "this is spam", and then it only Marks the email address as a "spam source", or adds it into a black-list of email addresses. However, when a user of the system of the present invention utilizes the Warning Module and the Reporting Button to report a Spam message, the system also analyzes contextually the Content of the spam message; identifies an attempt to commit fraud and/or to sell counterfeit goods and/or to infringe IP rights or copyrights or trademarks and/or to allow illegal downloads or pirated content and/or to provide illegal streaming of video/music/other content, and/or to commit any other IP infringements; the system identifies in the suspicious message a Link to an Online Item; and then updates the system's database to know that this particular Online Item (that was linked by the Spam message) is most-probably (or certainly) selling this particular fake product, or is performing other fraudulent activity. The information is later used for the analysis and scoring of the Online Item both as part of the analysis of the system, and to Warn a user—any other user—who visits the Online Item and considers (or tries) to buy/order a product/service, or to provide information to that Online Item, in addition to being used for Spam Filtering for other users. These operations may be performed by a Spam Email Contextual Analyzer 136, which may analyze the content of emails (or messages) that were reported by users as Spam, and may extract from them hyperlinks that point to web-pages, that are then analyzed to detect or to estimate that they offer for sale a Fake Product/Service.

In some embodiments, optionally, a crypto-currency payment or reward may be transferred or paid to a user that reported Spam, or to a user that reported that a particular web-page or website that is linked through a received email appears to be selling counterfeit or non-genuine goods or services or is providing access or facilitating access to illegal content or to pirated content or to a fraudulent website (e.g. Phishing website) or the like; thereby creating an incentive for users to report such linked destinations. In some embodiments, the crypto-currency payment is transferred immediately upon reporting; or, in other embodiments, only after human verification that a reported destination is indeed facilitating fraud; or, only after at least N users have reported that destination; or, only after a wisdom-of-the-crowd algorithm confirms that the reported destination is indeed facilitating fraud (e.g., based on aggregated reports from multiple different users).

In some embodiments, optionally, only a particular type of destinations or Online Items may be such that users that report them are be eligible for a crypto-currency reward; for example, based on a "fraud-reporting Bounty fund" that may be allocated or assigned by a brand-owner. For example, a genuine brand-owner, such as Sony Corporation, may allocate a Bounty Fund (e.g., 25,000 dollars, or 5 Bitcoins), to fund the crypto-currency rewards that are paid to users that report Online Items that sell or facilitate the sale of counterfeit or non-genuine Sony imitation products. Optionally, the system of the present invention may collect from the brand-owner the entire Bounty Fund amount, and may then distribute it gradually to eligible users that report such Online Items; or, the system of the present invention may gradually withdraw funds from such a Bounty Fund that is held by the brand-owner (or by a third-party on his behalf), or may replenish the available funds from time to time based on the number of eligible reports that were collected so far. In some embodiments, the Bounty Fund for crypto-currency reward may be pre-defined to be operational only within a pre-defined time period, for example, only within November and December (e.g., holidays season in which many online sales take place), or only within a pre-defined geographic region (e.g., providing a crypto-currency reward only to reporting users from the United States), or only regarding Online Items of a particular type or location or TLD (for example, providing a crypto-currency reward only to users that reported ".co.uk" destinations or Online Items), or only with regard to a particular product or a line of product (e.g., providing a crypto-currency reward only to users that reported an Online Item that sells counterfeit PlayStation items, and not to users that reported an Online Item that sells counterfeit Sony earphones); or only with regard to an Online Item that sells fake product that are worth at least a certain price (e.g., providing a reward only to users that report an Online Item that sells counterfeit Sony products that typically cost at least N dollars, such as at least USD 100), or only with regard to a particular brand or brand-name (e.g., providing a crypto-currency reward only to users that reported an Online Item that sells counterfeit products that bear the "PlayStation" brand, and not other brands of Sony Corporation), or the like. The entity that establishes the Bounty Fund, be it the brand-owner, or an agent of the brand-owner, or the system administrator of the system of the present invention, may define and/or configure other rules and/or conditions for payment of the crypto-currency rewards to reporting users. The system of the present invention may thus enable a brand-owner, or an agent on his behalf, to define and configure an "anti-counterfeit campaign" that the system of the present invention may then enforce and implement, utilizing the crypto-currency payment rewards as described.

For demonstrative purposes, some portions of the discussion herein may relate to "selling of counterfeit goods", which is a non-limiting example of various other types of fraud or fraudulent activity or illegal activity or illegitimate activity that the system of the present invention may monitor, detect, prevent and/or cure. Other types of frauds and online fraudulent activities may be similarly monitored, detected, prevented and/or cured by the system of the present invention. For example, a legitimate owner of a banking service, such as Chase Bank who owns the domain and the website "chase.com", may offer a crypto-currency bounty or other rewards for users that report imitation websites or "Phishing" websites that appear to be as if they belong to Chase Bank but actually are controlled by hackers or attackers or criminals that attempt to illegally obtain user credentials (e.g., username and password) from legitimate users. Similarly, the copyright owner of a copyrighted material, such as a motion picture (movie) or an audio recording (song) or other work of authorship (e.g., an electronic book or e-book), may offer a crypto-currency bounty or other rewards to users that report websites or web-pages or applications that distribute pirated digital copies or pirated digital versions of the copyrighted assets, or to users that report website or web-pages or applications that otherwise facilitate such distribution (e.g., by providing links or hyperlinks or "torrent" files or other pointers to the pirated content). Similarly, other types of fraud may be detected and prevented by the present invention, and similarly, users that report such fraud may be rewarded by crypto-currency payment or other reward. Similarly, the certification stamp of the present invention may be provided to genuine and non-fraudulent websites or web-pages or applications, to certify to the user and/or to his browser that the visited destination is indeed the genuine and non-fraudulent destination; and optionally, such certification stamps may be stored or verified by utilizing the block-chain dataset as described herein.

In some embodiments, the "wisdom of the crowd" as described above, and/or its aggregation as described above, may be used to authenticate or validate legitimate (non-fraudulent) Online Items. This authentication or validation may be done in combination with AI analysis as described above. As a result of such an authentication, the system may provide a manager of an Online Item the option to present the positive and validated score on his website, in a form of, for example, a validation stamp or a certification stamp, such as, an icon or logo of "this website is validated by the anti-fake system", or "the products offered for sale on this website are certified as genuine products by the anti-fake system", or the like.

In some embodiments, the validation stamp or certification stamp (e.g., "this website sells Genuine/Non-Counterfeit products"), may be implemented using a Blockchain technology. For example, the system or the unit that created the positive or validated score regarding the Online Items, may store the data in a database or a dataset or a linked list or other data-structure that utilizes a blockchain or that is implemented as a blockchain. The authenticity and/or the validity of the validation stamp or certification stamp, which may also be implemented as a certificate for an Online Item (e.g., in a similar way to SSL certificates), can then be checked (e.g., independently by a user or by the web browser or by an "app") by connecting to (or reading from) the blockchain based database or data-set or linked list, and checking whether the Online Item is in the ledger. Due to the secured structure of such a blockchain dataset (e.g., such that each record in the dataset includes inside itself a digital hash of the previous record), the deletion or addition of an Online Item (from or to the list of certified Online Items that are eligible to present a valid certification stamp), can be made only if a majority of the nodes of the blockchain agree to such a change or if a "consensus" is reached otherwise based on the particular blockchain protocol being used. A user that will click on such a validation stamp or certification stamp, will initiate or trigger a procedure that will perform a validation of the stamp with the blockchain database; or in some embodiments, optionally, such validation may be performed automatically and/or autonomously by the web-browser or by the Operating System or by a stand-alone software module or by a plug-in or add-on or extension, immediately upon accessing or visiting or browsing a destination that is associated with such certification stamp or validation stamp. If the particular Online Item that is being checked, is not within the ledger, then the user will get a warning notice or a notification that the certification stamp is not valid; and vice versa. If the Online Item exists in the ledger, then the user will get an affirmation notice or a notification that the certification stamp is valid. The installation of a valid validation stamp or certification stamp may be possible by utilizing a combination of public keys and private keys, that may be provided by the operator of an Online Brand Protection system as described above.

Some embodiments of the present invention may comprise a system, a method, a device, an application, a mobile application or "app", optionally implemented as or comprising a Web browser, an add-on module, a plug-in module, an extension module, or other suitable module, which enables a brand-owner or other third party to detect, prevent, reduce, eliminate and/or cure online fraud and/or fraudulent transactions via Online Items and/or fraudulent online activity and/or online selling of counterfeit goods and/or imitation goods and/or non-genuine goods, and/or "Phishing" attacks, and/or fraudulent or illegal or illegitimate or pirated content; particularly in a manner that provides a warning to the End-User that visits an online destination or that is interacting with or is accessing an Online Item or that is considering to purchase online a service or goods or is considering to download or to obtain digital content from an Online Item; rather than, or instead of, or in addition to, providing a notification to the genuine brand-owner about such detected incidents and such brand-infringing Online Items and about such fraudulent Online Items.

In some embodiments, a Bounty Reward(s) mechanism may be utilized to incentivize end-users to report to the system about web-sites, web-pages, domain names or domains, particular products, hyperlinks, links, torrents, pointers to items, "apps" or applications, that are suspected by the end-user or that are known by the end-user to be associated with (or to be facilitating or providing) fraudulent Online Items or fraud Online Items or fraudulent activity or pirated content or non-genuine goods or counterfeit goods or other illegitimate items. The Bounty Rewards mechanism may optionally provide to end-users rewards in the forms of digital currency or crypto-currency (e.g., Bitcoin, Ethereum, or the like).

In some embodiments, wisdom of the crowd and/or aggregated feedback from multiple end-users, may be analyzed and/or generated and/or utilized as an additional layer of information or as indicator that a particular Online Item is fraudulent, or conversely, that a particular Online Item is non-fraudulent or is genuine or is trustworthy.

In some embodiments, a Certification Stamp or a Validation Stamp or an Authenticity Stamp may be generated by the system, with regard to a particular Online Item, such as with regard to a particular web-site or web-page or "app", or even with regard to a particular goods or services that is offered for sale or for consumption through such destination, to indicate to the end-user and/or to his Web browser or to his electronic device (laptop, personal computer, smartphone, tablet, smart-watch, or the like). Optionally, a block-chain based data-set or data-structure may be used in order to store and/or validate an Authenticity Stamp or a Confirmation Stamp that was awarded to a particular Online Item.

The present invention provides an innovative decentralized anti-scam platform and system, which may alert users whenever they reach a fraudulent website, an online counterfeit sale, and other types of online scams. The system may bring trust to the e-commerce and online market, where the costs of counterfeiting and piracy are high. The system may be configured to focus on the cryptocurrency industry, which is flooded with phishing, fraud, brand-jacking, and other scams. The system may provide users with alerts against scams and crypto-transaction validations. The system may use two sources of intelligence: reports on potential scam by users of shared with the community, and providers of AI powered cyber-intelligence. The information from both sources is recorded on a blockchain, which may be launched on top of or as part of an existing blockchain (or as a new blockchain), and may be used as the source for the alerts and validations.

The decentralized platform includes bounties created by and by companies, organizations and users in order to incentivize members of the community to report potential scams. The cryptocurrency token is a "Token of Trust". It provides users with a guarantee for their transactions made on online websites being marked as trusted by the platform, after a community consensus is reached.

The platform brings together different stakeholders into one ecosystem—these stakeholders include users, companies, AI-powered cyber intelligence providers, guarantee providers, and enforcement services providers. The platform may leverage robust technology for monitoring the Internet and analyzing the potential risk of different online threats. The platform may be used by providers of AI powered cyber intelligence.

The Applicants have realized that the digital era changed our lives in many ways. The ongoing information revolution and the rapid pace of digital transformation is a catalyst for unprecedented levels and new types of cybercrime. Most of the cyber security solutions today focus on organizations and their IT infrastructure, which are basically under the control of the organization. However, the Internet allowed different threats to evolve in areas that are not in the direct control of the organization. Fraudulent activities, phishing, online counterfeit sales, and other scams, are different types of online scams that evolve rapidly with the constantly changing online platforms and software-hardware infrastructure they prey on. While this is a challenging problem across all online industries, the cryptocurrency industry faces this even more acutely, since it is based on a distributed model with no-centralized governance and regulation. In most cases, once financial transactions, fraudulent or not, are made, they cannot be reversed or undone or canceled.

The solutions that have been developed to counter these problems until now, have focused on helping companies and organizations to fight these scams by first detecting them and then acting to enforce their removal from the Internet (e.g., take them down). Unfortunately, while digital crime is thriving, a meaningful response from governments and law enforcement authorities has not been forthcoming. These scams continue to proliferate unabated and continue to pose considerable risk for both individuals and companies alike.

For today's Internet end-users, the main layers of cyber security are anti-virus and anti-spam measures. While existing solutions provide basic or partial cyber fraud protection to companies and organizations, today's Internet end-users and consumers have no protection against the online scams that continue to evolve. With the rise of the cryptocurrency industry, which is particularly susceptible to cyber fraud, today the Internet end-user faces even greater financial and other risks.

The present invention provides is an innovative decentralized anti-scam platform and system. It creates an ecosystem that enables all affected parties to tackle these problems and create confidence and trust in online transactions. In a demonstrative embodiment, trust is provided to the cryptocurrency industry, thereby allowing more users to enter the market. As the market evolves, the solution of the present invention may be adapted or configured to accommodate the entire e-commerce and online ecosystem. The system provides a solution to users that will alert them regarding online scams, including phishing, fraud, counterfeits, and other scams. The decentralized platform is based on two sources of data stored on the blockchain: reports on potential scams made by users, and AI powered cyber intelligence providers.

The system of the present invention may reward users that report potential scams for community use and benefit, with bounties from: (a) the system's operator, and/or (b) companies and organizations that are interested in encouraging such reports related to their brands, and/or other stakeholders or participants that would like to provide incentives (e.g., another end-user that has just benefited from the system and avoided an online scam that could have cost him hundreds of Dollars; a government agency or authority, a law enforcement agency or authority; private or community organizations that support fair trade or better business practices; and/or other participants or stakeholders).

The users of the system may gain trust and confidence in their online transactions. Moreover, for those who choose to use the tokens, the platform may provide a guarantee for transactions that were made with regard to online items marked as "trusted by the platform" of the present invention.

The cryptocurrency token of the present invention is a "Token of Trust". The token represents the value of trust, by firstly providing value for the scam reports made by users, and secondly for the guarantee that the platform provides based on those reports.

The first AI powered cyber intelligence provider for the platform, may utilize technology for monitoring the Internet and analyzing the potential risk of different online threats. The cyber-intelligence information from the system, which may be used by companies to fight online scam and fraud, may also be available to the typical, individual Internet user via the platform.

The platform also adds an additional layer of crowd-wisdom to fight online scams that does not exist to date. This allows community involvement in the fight against online scams, fraud and counterfeits; an involvement which is incentivized by a cryptocurrency, the token of trust.

The system and platform will not only help individual Internet users, but will also benefit all stakeholders—companies, organizations, solution providers, law enforcement agencies, and other entities. It creates an alliance between all stakeholders, based on fulfilling their different needs or roles; for users it provides confidence, for companies it helps stopping infringements, and for solution providers it provides information as well as monetization options.

The system may thus create an economy of confidence, based on the platform and its Token of Trust. Blockchain technology, which is a means to transfer digital value, is utilized by the system to establish the value of communal trust in online transactions and to also monetize it. The system may be based on four components or pillars: a decentralized vote of trust; a consensus of trust; a technology-based analysis of trust, and a guarantee that is based on them. These are the pillars of the value that the system brings to the community, to inject confidence and trust into online transactions.

The system is the world's first Anti-Scam Platform. It utilizes a robust and innovative AI powered cyber intelligence system for online brand protection, anti-counterfeiting, and anti-fraud. The system scans and dynamically monitors the Internet to find scams of different types including fraud, counterfeits, trademark infringements, or the like, on websites, ecommerce marketplaces (e.g. Amazon, eBay), social media platforms, apps and pay-per-click (PPC) ads.

The system provides services to brand owners from different industries, including banking, financial, cryptocurrencies, insurance, consumer goods, fashion, pharmaceuticals, entertainment, technology, IT, ecommerce, gaming, software, non-profits, and more. The platform may optionally be implemented as "Software as a Service" (SaaS). The system may improve the way companies and organizations can manage and protect their digital brand by providing the highest level of business intelligence for online brand protection, anti-fraud and anti-counterfeiting. The holistic approach consists of both unique technology and enforcement services. These capabilities provide the platform with a profound understanding of the landscape of online scams and the characteristics of the players in this industry. Knowledge and technology accumulated in the field of brand protection, may be leveraged to provide the building blocks of the technology and offering of the present invention.

The Applicants have realized that The growth and development of the Internet has created new risks. These risks include cases of fraud, phishing, counterfeits, violation of intellectual property rights, exploiting of brand names, impersonations, identity theft, imitations, slander, misleading of customers, etc. Online "scam" is a general term representing multiple methods of using digital mediums for fraud, phishing, counterfeit sales, etc. The damage from counterfeit and pirated goods is significant. Online brand abuse and the sale of counterfeits are both growing exponentially. Driven by growth of e-commerce, as well as the sophistication of hackers, this has become a major threat for companies of all sizes. The problem is accelerating due to other concurrent changes in the Internet arena, including the increase in traditional cyber security threats, the introduction of new generic Top-Level Domains, the evolution of online marketplaces, and more.

The Applicants have also realized that there are many scams in the cryptocurrency ecosystem. The rapid growth of the cryptocurrency industry has reached millions of people who are new to the industry and therefore more vulnerable to online cryptocurrency scams. The number of blockchain-based wallets issued has gone up dramatically hand-in-hand with the growing number of new users joining the cryptocurrency space. In the cryptocurrency industry the different types of online scams, including phishing and fraud, pose an even greater challenge, since the whole industry works in a distributed model with no-centralized governance and regulation. In most cases, once a financial transaction, fraudulent or not, is made, it cannot be reversed or canceled. It is estimated that more than 10 percent of funds raised in ICOs up to 2018 had been stolen. Phishing is a common form of funds theft during ICOs. Its popularity is attributed to its simplicity and effectiveness. Scammers either request a funds transfer to their wallet or swindle private keys to investors' wallets.

The Applicants have realized that there are parameters that make ICOs in particular and the cryptocurrency ecosystem in general vulnerable to risks, thefts, frauds and scams. (a) Big money and no governance attract fraudsters: The speed and size of the ICO market draws hackers' attention. Hackers are attracted by the rush, absence of a centralized authority, blockchain transaction irreversibility and information chaos. (b) Low emphasis on security: Cryptocurrencies companies' founders often focus on the funding stage and attracting investors while security is often not prioritized. This situation is being exploited by scammers. (c) The bigger it is, the more attractive it is for scammers: The hype of the cryptocurrencies and the extensive media coverage of successful ICOs are drawing attention of everybody to this market: investors and scammers alike. (d) Hacking also leads to indirect losses: for example, a project's loss of reputation and investors' loss of their sensitive personal data.

The Applicants have realized that Trust is a key element in any economy, especially in emerging economies such as cryptocurrency. Lack of trust can hold-up growth of the market. There is a need to provide assurance to users that conduct transactions in the cryptocurrency world that they are indeed dealing with the intended entities, in order to attract more people to use cryptocurrencies. To enable sustainable growth of the cryptocurrency industry while expanding the user-pool from early-adopters to the wider public, there is a need to provide solutions that will foster trust and prevent fraud.

Scams' effect on the cryptocurrency users: Every fraud incident has a ripple effect on the lack of trust in the market. As "trust" is a quality that is hard to "achieve" and yet very easy to "lose", when lack of trust reaches a tipping point the inherent risk and danger to the nascent cryptocurrency ecosystem could be catastrophic. Evidence of a steady march towards such a mounting crisis and tipping point in the lack of trust is beginning to show up. Data shows an alarming rise in the number of users searching for the term "Cryptocurrency Scams". As a reasonable proxy, this may indicate the rising concerns and increasing lack of trust of the cryptocurrency community. This may have a devastating impact on the penetration of the cryptocurrency concept and stifle the growth of this fragile, nascent industry.

Scams as a part of the cryptocurrency ecosystem: Cryptocurrency companies are exposed to numerous threats in all stages of their life cycle: from the ICO process to the day-to-day course of business. Moreover, the shift from the money raising phase to "the-day-after" holds various risks. An example of the ongoing scam potential, fraud attempts, and thefts can be found in the IOTA case, in which around $4,000,000 were stolen from private wallets; this was not the result of a flaw in the network or wallet, but instead was the result of fraud: By using a phishing website that appeared to be a legitimate IOTA seed generator, the scammers were able to collect a large number of seeds over a long period of time; They preyed upon the trust of the community, and spent time carefully optimizing the page to appear higher in search engine results, further legitimizing their scam in the eyes of unsuspecting community members. The evolution of the threats, the level of complexity and ingenuity of the scammers, extend the relevance of the Anti-Scam efforts into a necessity.

The pain is relevant for both users and companies. The system of the present invention is in a unique position to serve all stakeholders while creating an ecosystem that creates synergy for the benefit of all parties. This can assist in transforming as a de-facto standard to the crypto world that will assist in establishing confidence for users.

In a demonstrative embodiment, the system comprises multiple entities, for example: the end-user who wishes to purchase a product, such as a cryptocurrency or crypto-coin; the company that sells or issues the product or the crypto-currency; one or more AI-powered cyber-intelligence enti-ties; a community of reporting users; one or more commu-nity enforcers or community-based enforcement entities; a guarantee provider or a warrantee provider, which provides a guarantee or warrantee with regard to the authenticity of the product or crypto-currency purchased and/or with regard to the transaction as a whole and/or with regard to a least a particular portion of the transaction.

The decentralized anti-scam platform of the present invention enables users to perform their day-to-day online transactions with full confidence. The platform may include the application, a blockchain (e.g., a new one, or optionally launched on an already-existing blockchain), AI powered Cyber Intelligence Providers, Enforcement services Provid-ers, Guarantee providers, bounties, and the Trust Stamp. The ecosystem may also include end-users of the application, as well as companies and organizations who are looking to protect their brand, website, investment, and clients.

The application may have three main features. (a) Alert against scam: will alert users when they reach a scam online item (such as a website, social media post, marketplace listing etc.), attempting to perform fraud, phishing, sell counterfeits, etc. The alerts will be provided in different levels of detail. A general potential risk score will be presented, as well as specific scores based on users' reports, and on the AI powered cyber intelligence provider. (b) Crypto-transaction validation: will perform a validation pro-cess that matches a wallet number and a website. When a user intends to perform a cryptocurrency transaction, the app will alert the user when the wallet to which the transaction is about to be made does not match the validated wallet of the website. This will protect the users of from cases of hacks and fraud of different types that intend to steal their tokens. The transaction validation process will be performed by the app based on the blockchain. (c) Reporting scam: The application will allow users to report online items (websites, social media posts, specific listings on ecommerce market-places, etc.), that they suspect as a potential scam (fraud, phishing, counterfeit sales, etc.). Users will also be allowed to provide a positive report on a website, social media post or a marketplace listing which they believe can be trusted. The reports submitted by a user will be recorded in the blockchain and will be visible to the public.

The scam reporting functionality is an important compo-nent in the decentralized anti-scam ecosystem. The reports by users create a community that acts together to fight scams and be aware of scams. Reports provided by users are recorded on the blockchain, aggregated to create a consensus on the state of a specific online item or product or destination or URL or URI or website or web-page or crypto-coin or crypto-currency, and are shared with the entire community of users.

A user of that has been subject to a scam of any sort, or that suspects an online item to be a scam, can report the potential scam through the app. The report may be provided in different levels, for example: Basic Report—click a button such as "Report Scam", and optionally also providing a score about the severity of the scam (e.g., on a scale of 1 star to 5 stars); or a Detailed Report—which provides additional data such as: type of scam (phishing, counterfeit, misrepresentation, etc.), which brand/company the scam is against, reasons for suspicion that this is a scam (for example: crypto-wallet number is not real, the owner of the website is not the same owner of the company's website, the website is hosted with a hosting provider unrelated to the hosting of the main website, products provided are counter-feits, etc.), report a specific scam incident (date, damage suffered, etc.) and more.

The reports will be stored on the blockchain and be exposed or accessible to the public; or, in some embodi-ments, to at least a group of users (e.g., premium subscribers that purchase a decryption key to access the reports or to decode them). The aggregated type and number of reports may be presented to users of the system in the Alerts section of the application. In order to incentivize users to investigate and provide additional input on online items suspected as scams, the platform manager may publish on its website a list of reported scams, which were initially reported and for which the users have not reached a consensus yet.

As a method intended to prevent "spam" in the reporting process, and optionally based on a proof-of-work concept, a user that reports a scam may be required to deposit tokens. The actual amount may change over time by the platform manager, yet a nominal fee (for example, an amount equiva-lent to 50 cents or one dollar) will be required to file a scam report. This will help in preventing different types of spam activities, or activities that inject noise or "false data" into the database of reported scam.

If the report is found to be true as part of the consensus process described herein, and the user is found eligible to gain a reward from the bounty, then the tokens deposited will be returned to the user (e.g., in addition to receiving the bounty). If the report was found as wrong or incorrect or false, then the deposited tokens will be added to the General Bounty as described herein, and are not returned to the reporting user.

When opening an account, users will be granted a credit of tokens to allow an initial amount of scam reports (for example, up to 5 reports), at no initial cost. These tokens will be marked in the blockchain and may be locked so that users will not be able to trade or exchange or transfer them. After these initial "no cost" reports, users need to obtain or buy tokens in the market in order to continue scam reporting.

The scoring system: The alerts provided by the app will be in a form of a potential risk score—for example: High risk, Medium Risk and Low risk. Trusted websites, social media pages or marketplaces listings will be marked by the app as "Trusted". The scoring algorithm is based on a combination of an AI and big-data engine of a cyber intelligence provider, and of the crowd-wisdom, collected from the users of the app. The users will be presented with a general score, along with the AI powered score and the crowd=based score, to allow them to better understand the sources of the risk score. The crowd-based score will be generated by reaching a consensus of users on a certain online item—whether it is a scam or can be trusted. In terms of crowd-based scoring, once a consensus was reached, if contradicting reports are submitted (e.g., beyond a minimum threshold number or percentage), they may initiate or trigger a re-scoring process.

Bounties will be created in order to incentivize and reward reports of potential scams by users. The bounties will be created using tokens contributed by the following: (a) General bounty—such as, 20% of the tokens paid by users who subscribe to the premium subscription (which includes a guarantee as described below), and 80% of tokens that were deposited by users whose reports were found to be incorrect in the consensus process, will be contributed to a general bounty. (b) Brand bounty—a company or organization that is interested in incentivizing users to report scams that relate specifically to its brand will be able to create a bounty accordingly. In order to maintain the ecosystem and operations, including the blockchain, apps, validation processes, bounty programs etc., 20% of the bounties created by companies and organizations, will be paid out for operational costs. (c) Community bounty—a user that is interested in incentivizing other users to report scams will be able to initiate a community bounty. A community bounty may be referred to protecting a certain brand, or any other type of name or cause.

Reward principles: The bounties will be distributed between users that report on a potential scam based on pre-defined parameters such as the amount rewarded per item reported, type of reports and their reward (website scam, social media scam, etc.), maximal reward per user for an item reported, number of users reporting needed to create a consensus and to apply an award, and more. The definitions of these parameters will be defined by for the general bounty and by each company or organization for its brand bounty, and by each user for his/her community bounty. These definitions may be changed over time. Generally, bounties will be structured so that the first user reporting a potential scam will be rewarded with a higher amount than other users that validate the report and take part in the consensus creation process. A Detailed Report will be rewarded with a higher amount than a Basic Report in order to incentivize users to provide more information in their reports, to allow the community to better understand the validity of the report, and to expedite the consensus creation process. A report by a user for a potential scam not known to the cyber intelligence providers will be rewarded more than a report of a potential scam already known to the cyber intelligence providers (i.e. an online item that already has a score level and is alerted in the application). Reports that validate a website that was already evaluated as not a scam by a cyber intelligence provider may be rewarded at a lower level of reward than a report about a scam.

Consensus process: A consensus must be reached in order for the bounty assigned for a scam report to be distributed. The consensus must require an agreement among users reporting to the platform, and optionally may also adhere to the cyber intelligence provider's score. The number of users required to reach a consensus will be defined by the bounty manager (for the general bounty, companies and organizations for their brand bounty). The number may change based on the type of the online item being reported (whether a website, a social media post, etc.).

For illustration purposes only, the following are possible scenarios that may apply in the process of reaching a consensus between the crowd and the AI powered cyber intelligence provider. For simplification of this illustration, the scores are divided into Red (Scam) and Green (Trusted). (a) Consensus reached: when there is a consensus between the score reached by the crowd and the provider—i.e. provider score is Red and crowd score is Red, or provider score is Green and crowd score is Green, a consensus is reached. The goal of is reporting scam. In case of a provider Green score, Green crowd reports will not be granted with a bounty reward from the general bounty. (b) No consensus, scenario 1—provider score is Red, crowd score is Green: In this case a scam alert will continue to appear due to the provider Red score. To avoid cases in which scammers try to abuse the system, if the entity that owns or controls the online item (e.g. the website) is a legitimate entity and wants to dispute the Red provider score, the entity will be required to file a request for a Trust Stamp, in which a validation process will be performed. Green crowd reports will be granted with a bounty reward in case a validation process of a Trust Stamp is finalized. (c) No consensus scenario 2—Provider score is Green, crowd score is Red: In this case, when a scam report is provided by users for a website that has a Green score but was not previously validated (i.e. does not have a Trust Stamp), an alert will be provided to the cyber intelligence provider, to perform and validate the Green score.

In some embodiments, in the case where a user files a report on a website that has a Trust Stamp, the user will be required to deposit a predefined amount. Once such a report is filed, an Investigation Procedure, similar to a Trust Stamp validation procedure, will be triggered and initiated. The requirement in this case for a deposit by the users as part of a report is intended to prevent false reports by users who are interested in hurting a legitimate organization. In case the Investigation process finds that the report was false, the tokens deposited will not be returned to the reporting user(s). In case the investigation process finds that the report was true, the tokens deposited will be returned to the reporting user(s), and the bounty will be distributed among the reporting user(s). The tokens used to process an investigation process will be taken from the bounty allocated for such a case.

Security: the system may implement security measures to prevent abuse by automated scripts or "bots", or users with the intention to harm by either exploiting the bounties or providing false positive or negative reports. The method intended to prevent spam in the reporting process, similar to a proof of work concept, demands that a nominal amount would be paid by users for reporting scams.

The Trust Stamp is intended to be a certification stamp that will be provided by to verified and validated online items such as websites or web-pages including, for example, to a specific listing on ecommerce marketplaces, social media accounts or pages, etc. The stamp will allow users to know that the website they have reached is a genuine website, and not a phishing or fraud website, or that a specific marketplace listing is genuine, etc. To gain a Trust Stamp, the website owner, the seller on a marketplace, the social media account owner, etc. will apply for validation by the system operator. The validation process is performed by the AI powered cyber-intelligence provider validation officers, who will check different information, at a process similar to a Know Your Customer (KYC) process, including validation of the organization behind the online item, validation of address, email, phone numbers, incorporation documents, key personnel, trademark documents, current and/or past domain ownership records, certifications and partnerships (for example, whether a certain seller is an official seller or distributor of a brand or of certain products), etc. The process may include a verification that the owner of an online item (for example, a registrant of a domain name), is actually the entity that claims the ownership. Requirements may change based on the online item being validated—website, social media page, marketplace seller or listing, etc. The stamp can be given only to online items that have a high trust score (or a low risk score) of the AI powered cyber-intelligence system, as well as high trust score (or low risk score) by the crowd. In addition to the provider validation officer, for each validation process, two public validation officers will be required. The public validation officers will be required to perform a set of validations similar to those required of the provider validation officer.

Once two public or crowd validation officers have performed their validation, the Trust Stamp will be granted to the applying party, and the validation documentation collected by the provider validation officer, and the crowd validation officers will be shared with the public (or with at least a group of users) on the blockchain. A party applying for a validation stamp will be required to pay for the validation process using the token. The tokens paid by the applying party will be divided between the system administrator, the AI powered cyber-intelligence provider, and the public validation officers. In order to become a validation officer for a specific validation, any application user can apply. The officers will be chosen on a first come first served process, which will be public; or based on other rules or criteria (e.g., must live in a certain geographical region; or must be proficient in a certain language; or the like). Yet, the officers will be obligated to perform the validation within a limited time period, otherwise the validation will be moved to the next user in line. Applying to be a validation officer of a specific validation, will only be available to Premium users, who have performed a full KYC process with regard to themselves.

The Trust Stamps will be encrypted and stored on the blockchain. Storing the stamps on the blockchain will prevent tampering with the certification data, and will enable browsers and applications that use the systems' SDKs, to verify the authenticity of the stamp presented to the user. The authenticity and the validity of the Trust Stamp can be checked by connecting to the blockchain data-set or database and checking whether the online item is in the ledger. Due to the secured structure of such a blockchain data-set or database, the deletion or addition of an online item (from or to the list of certified online items that are eligible to present a valid Trust Stamp), can be made only if a majority of the nodes of the blockchain agree to such a change or if a "consensus" is reached otherwise based on the particular blockchain protocol being used. This will prevent a false presentation of the Trust Stamps.

The Trusted Wallet Stamp: Similar to the Trust Stamp, the system may issue the Trusted Wallet Stamp to verified entities, such as websites, sellers on marketplaces, social media accounts, etc. The Trusted Wallet Stamp will have an additional level of validation in which the owner of a certain cryptocurrency wallet will be verified. The stamp will then not only verify to users that the website they have reached is a genuine website of a certain company, and not a phishing or fraud website, or that a specific marketplace listing is genuine, etc., but will also verify that the wallet to which they are about to transfer tokens is actually owned by the entity they are intending to transfer the tokens to.

For example, a user uses and/or reaches a website that has a Trusted Wallet Stamp, the app or the system of the present invention will verify that the wallet number the user intends to send the tokens to is actually the wallet number that was validated as the one owned by the website owner. In case the wallet to which the user intends to send the cryptocurrency does not match the website in which the user is browsing, the user will get an alert from the app or from the system. Furthermore, the data known and verified by the system about the entity to which the user intends to send the tokens will be presented to the user, to allow the user to further verify the target entity. Similar to the Trust Stamp, the Trusted Wallet Stamp data may be encrypted and stored on the blockchain. Users that use the app, or wallet, apps and/or browsers supporting the validation blockchain through an integration of SDKs, will be alerted in cases where the wallet they are transferring cryptocurrency to, does not match the intended entity.

The Trusted Wallet Stamp and the alerts created in cases of unmatched wallets, will help prevent users from being subject to different types of scams and fraud, such as a hack to a website, in which the wallet number presented to the public has been tampered with.

The validation of a wallet owner will be another step in a similar validation performed for the Trust Stamp, as explained above. Using different security measures, the provider validation officer, and the public validation officers, will verify the owner of a wallet. In some implementations, validated entities that can get the Trusted Wallet Stamp will not be limited to online items, such as websites, sellers on marketplaces, social media accounts, etc., but rather, a Trusted Wallet Stamp may also be provided to private people or organizations.

The implementation of the Trusted Wallet Stamp, as part of the ecosystem, which includes the App and the SDKs, will allow the creation of a trusted network of entities and users, prevent scams and fraud, and allow secured and trusted transactions for the cryptocurrency community.

The system may be available to users in different formats, for example: Mobile App; Desktop App; Browser extension or add-on or plug-in; SDK's to other applications; Software (client), or stand-alone client-side software; JavaScript widget or code; a JavaScript/HTML5/CSS code that may reside on a remote server and may be added or called-to or invoked by a web-page or web-site or widget or mobile application; a system administrator's Website, for users who did not yet install any of the above applications and will still be able to perform queries using the system's database through the website; a Protection Server—a solution to provide Internet Service Providers or Organizations with the ability to use the platform or the application as part of their network and alert users about potential scams.

In some embodiments, the platform will not monitor users browsing and will not save any browsing data of a user. This may be a leading principle of the platform's privacy policy. The application will only alert users on potential scams, based on a specific and momentary query of the database for each browsing instance. No user data related to the query will be saved at any point by the system, unless explicitly required and stated, for example, in cases that relate to a transaction to which a guarantee applies, etc.

The trusted partners community: the system may help the online community in general and the cryptocurrency community specifically to perform daily transactions and online commerce in a scam-free and trusted manner Consequently, it may allow any legitimate party that shares the same vision and is interested in allowing its users or community to enjoy the AI powered and crowd wisdom based anti-scam platform. For that, the system may create different Software Development Kits (SDKs) that will allow application providers, crypto-wallet providers, browsers, security software and hardware vendors, etc. to integrate into their software. This integration will result in the users of these applications, wallets, browsers, software, etc., getting alerts on potential scams directly while using them. Specifically, integration of the SDKs to wallet providers will allow an implementation of the Trusted Wallet model, so that transactions to trusted wallets on the wallet providers' application could be guaranteed.

The platform of the present invention may utilize one or more functions of the BrandShield system as an AI powered cyber intelligence provider, performing AI and big data analysis of online risks, which is a core source of cyber intelligence to provide the users with alerts against scams Such AI powered cyber intelligence provider may be or may comprise an AI powered online brand protection and cyber intelligence system, that operates to help organizations fight scams of different types including fraud (including types of phishing and brandjacking), counterfeits, trademark infringements, piracy and more), in various fields such as banking, financial, cryptocurrency, insurance, software, IT, gaming, fashion, pharmaceuticals, sports, consumer goods, travel, automotive, non-profits, and more. The artificial intelligence (AI), machine learning, and big data technology perform an advanced and automated metrics driven analysis of online risks. Its robust technology finds scams such as fraud, counterfeits, trademark infringements, and brand abuse across multiple platforms including website, marketplaces, social-media, mobile apps, and PPC ads.

The AI powered cyber intelligence provider, for example: analyzes content and metrics; uses algorithms to automatically prioritize the level of risk; uses machine learning to improve results based on actions; implements pattern recognition that finds major scammers; includes proactive enforcement tools.

The system may be a subscription based online software as a service solution (SaaS). It also provides the companies and organizations that subscribe to the SaaS one or more optional enforcement and takedown services. The deep analysis capabilities enable a sophisticated metrics-based enforcement strategy that provides a professional team with the ability to focus enforcement efforts on the most damaging threats to the brand and on major abusers.

The system may include the following modules: (a) Websites module—monitors for scams over the web including content, logos, infringing domain names in all ccTLDs and gTLDs, and more. (b) Marketplaces module—an automated, algorithm-based solution to monitor against counterfeit sales on marketplaces such as eBay, Ali-Express, Tao-Bao, etc. (c) Mobile Apps module—scans major app stores and finds abusive apps. (d) PPC Ads module —scans and monitors ads on Google and Bing to identify scammers that divert traffic to competitors or counterfeit websites. (e) Social Media Module—scans major social media platforms to find scam activities and counterfeit sales.

Monitoring for websites who perform scams: The system scans and monitors the Internet to find websites that perform different types of scams including phishing, fraud, counterfeits, piracy, trademark infringements, etc. The system measures and collects data about suspicious websites and automatically analyzes multiple metrics such as: Web content (using NLP—Natural Language Processing); SEO data; Domain names, including current and/or past ownership records; Traffic and statistics; Search engine results; Technologies and structures of the website; Meta-tags and the coding; Use of logo. The system prioritizes risks using algorithms and automated metrics-driven analysis. The system provides a risk score to each of the websites monitored. This allows focusing attention and alerting on the websites that present the highest risk.

Social Media monitoring: The system monitors the major social media networks such as Facebook, Twitter, etc., to find all uses of a brand and prioritizes risks by giving a higher risk score to those that potentially perform scams or link to them, perform fraud or phishing, sell counterfeits, infringe the trademark, etc. The system performs analysis and prioritization of suspected infringing posts, accounts, pages, people, events, groups, shops, etc. Similar to the Websites module, in the Social Media module the system uses multiple technologies to analyze the web metrics that provide a higher return to the scammers. The system analyses multiple metrics, such as: The content of the posts, pages, etc. (using NLP—Natural Language Processing); Social engagement data; Account and user names; Traffic data; Search results; Meta-tags and the coding; Use of logo—cutting edge technology developed by locates logos within graphic items and uses the data for prioritization and sorting. The Social Media module uses algorithms and automated metrics-driven analysis to prioritize potential risk of posts, pages, groups, etc. The system gives a risk score to each monitored social media item, which allows focusing attention and alerting on posts, pages, groups, etc. that present the most risk.

Marketplaces monitoring: A vast majority of online sales take place in Marketplaces such as Amazon, eBay, Ali-Baba, and Tao-Bao. Many scammers use these Marketplaces as a platform to distribute counterfeited products. The system includes an automated, algorithm-based solution to monitor Marketplaces and find potential counterfeits. The system performs analysis and prioritization of suspected infringing listings across the different Marketplaces. Similar to the Websites module, in the Marketplaces module the system uses multiple technologies to analyze the web metrics that provide a higher return to the scammers. The system analyses multiple metrics, such as: The content of the listings. (using NLP—Natural Language Processing); Seller names; Listings and seller's statistics and engagement data; Search results; Meta-tags and the coding; Use of logo. The Marketplaces module uses algorithms and automated metrics-driven analysis to prioritize potential risk of listings. The system gives a risk score to each monitored listing, which allows focusing attention and alerting on listings that have the highest probability of being a counterfeit.

Mobile Apps monitoring module: The Applicants have realized that trademark infringement, counterfeit sales and brand abuse in mobile apps present a constantly evolving threat to brands. The Mobile Apps module scans major app stores to prioritize apps suspected in performing different types of scams. The system performs analysis and prioritization of suspected infringing apps; the system analyses multiple metrics such as: Description content of the apps (using NLP—Natural Language Processing); App names; App characteristics; Developers names and statistics; Download statistics; Use of logo; Users ratings and reviews. The Mobile Apps module uses algorithms and automated metrics-driven analysis to prioritize potential risk of apps. The system gives a risk score to each monitored app, which allows focusing attention and alerting on apps that present the highest risk of being be a scam.

PPC Ads monitoring: the Applicants have realized that many scams start by publishing a deceiving advertisement that leads to an online page that performs the scam. Trademarks and brand names abuse in PPC (Pay-Per-Click) ads is increasing by the day. Scammers divert potential customers to other websites that commit fraud, phishing or sell counterfeits. The "PPC Ads module" scans search terms on major search engines, and analyzes the published ads and their links, allowing to find, analyze and provide alerts on fraudulent advertisements.

The AI and Big-data powered cyber intelligence provider may use Artificial Intelligence (AI) and Big-data analysis across its modules. The technologies implemented allow reaching unmatched anti-scam intelligence. The technology includes, for example: risk pattern recognition; machine learning (ML) or deep learning; and big-data analysis.

Risk pattern recognition: The system cross-checks different data points across websites, social media items, marketplaces listings, apps, and PPC ads. This allows finding risks that share similarities hidden from the human eye. This capability of the system finds major networks of scammers, such as networks of websites, connected social media posts or pages, linked listings, apps, etc.

Machine learning: Machine learning and deep learning technologies allow the system to improve results based on users' activity, changes of metrics in different online items, and more. The machine learning allows the system to improve its scores and pattern recognition as it collects and measures more data and actions.

Big-data analysis of historical data: The system performs ongoing scans of the Internet to collect information about potential scams. The system records the data it collects in every periodical scan in its data base. A big-data analysis facilitates discovery of important intelligence based on the historical data recorded, as well as finding and analyzing changes over time, data patterns over time, etc.

The platform and the ecosystem: AI and big-data powered cyber-intelligence is the core technology on which the ecosystem will be built. The system's technology may be utilized as the first AI powered cyber intelligence provider to the platform. The intelligence that was until now a source for companies and organizations only to fight scammers who abuse their brands will now be made available to the public through the platform and application(s), and will protect the community and purchasers against scams. The system may be used to monitor brand names online across different platforms—including websites, social media, apps, marketplaces and PPC ads. The scoring performed by for potential online scams will be used to provide alerts to users of that reach the online items that were detected and analyzed by the system. Initially, in some embodiments, the monitoring and alerts will focus on cryptocurrency and blockchain related brands (companies and organizations), but will be expanded as it evolves, to other industries and products to allow alerts on different scams such as fraud, phishing, counterfeit sales, piracy, etc. The generated scores may be encrypted and stored on the blockchain to allow a higher protection from potential hacks and alterations to the risk scores.

The platform and community will create a layer of information that was not available until now for online brand protection and anti-scam: crowd wisdom. Users will provide their own reports and feedback on potential online items that perform scams. This information will be stored on the blockchain and shared with the AI powered cyber intelligence providers, being the first provider on the platform. The alert of an unknown potential scam by an end-user will trigger a scan by to analyze the risk based on its unique technology. The analysis will be fed back to the blockchain, and so on. This creates an ongoing process of feedback between the crowd and the cyber intelligence provider, allowing improvement of scoring through additional intelligence and machine learning. Furthermore, the system may automatically monitor the web for scams (fraud, phishing, counterfeits, etc.) utilizing different technologies and data sources. This additional layer of crowd wisdom will also allow the system to enable brands to better protect their users and enforce better against scams reported by the community. Companies and organizations that are interested in subscribing to the system and receive the complete anti-scam and cyber intelligence system provided by will be able to do so by using the tokens.

Guarantee and Guarantee providers: The system and model are based on multiple sources of information and processes—the AI powered cyber intelligence provider, the reports from the community, and the validation processes for the Trust Stamps. The information and processes are used to assess the potential risk of an online item to be a scam—whether a fraud or phishing website, a counterfeit sale, etc. By analyzing the potential risk, it is possible to identify the online items that have a low risk and provide users with a guarantee for their transactions accordingly.

The users of will be able to use their tokens, to subscribe as premium users. Premium users, by subscribing, will get a basic Money-Back-Guarantee, and the option to use the tokens to buy different levels of additional guarantees from the system administrator, or from other guarantee providers. In addition to the basic Money-Back-Guarantee, a premium subscription will include the right for the user to benefit from the bounties created to incentivize reports of scams.

The meaning of the Money-Back-Guarantee will be that if a user performed a transaction on a website that was marked by as a trusted online item (website, webpage, listing on a marketplace, etc.), while the online item was actually a scam (phishing, counterfeit, etc.), the user will have the ability and the right to claim back (e.g., from the Guarantee Provider) the money paid in the transaction. The Guarantee will provide users with an ability to transact with a high level of confidence and trust, especially in the cryptocurrency industry, and with cryptocurrency-based services and ecommerce. The basic guarantee offered with the premium subscription will be capped at a certain value per transaction, and for a certain amount of transactions for a period of time. On top of the basic guarantee provided with the premium subscription and other Guarantee providers will offer different Guarantee Programs. The Guarantee Programs will allow users to pay a higher number or amount of tokens and get higher levels (caps) of guarantees, per transaction, over time, etc.

Initially, the guarantees provided by will be restricted to cryptocurrency-based transactions, and may be limited to websites with a Trusted Wallet Stamp. The transparency, which is an inherent characteristic of the blockchain technology, allows tracking transactions and therefore will allow to easily and transparently investigate a claim about a transaction that was made on a website presented as trusted by the system administrator, when it was actually a scam website. The system administrator and/or other providers may offer guarantee programs to protect from counterfeit sales on websites or on different ecommerce marketplaces.

To prevent fraud by users against the system itself, different measures will be taken; for example, the app of the system will record details of the transactions made, and the webpages visited or accessed, and will save them in the blockchain, in order to allow a transparent review of the guaranteed transaction and/or the operations that led to it and/or the operations that formed the transaction. Furthermore, users may be required to perform a KYC or similar processes as part of a claim process, or as part of a certain guarantee program, or as a condition to invoke a guarantee.

The scams that the system will guarantee against are those resulting from different brand hijacking or "brand-jacking" and impersonations of one entity to another—such as phishing, or sales of a counterfeit products. The system's model is based on AI and big-data analysis and community reports that allow detecting such fraudulent activities. It may not necessarily detect scams (or guarantee against scams) resulting from different types of financial or business fraud—for example, a company that runs an ICO and then performs fraud by disappearing with the funds is not the type of scam that the system would guarantee against. Furthermore, a website of a company that performs such fraud might get an initial AI trusted score, and might get a Trust Stamp or a Trusted Wallet Stamp, but might still perform the type of fraud presented above. While the system may decide to allow users to report such potential fraud, and may present this information to users, this is not necessarily the type of fraud that a guarantee can be provided against. Some embodiments may allow providers to offer insurance policies in addition to the guarantee programs.

AI powered cyber intelligence providers for the ecosystem: the platform may provide scam alerts and perform the risk analysis in order to provide guarantees to transactions in trusted online items. This may be based on two sources of information: the public community (through user reports), and an AI powered cyber intelligence provider. A first AI cyber intelligence provider for the platform of the present invention, or other components of the present invention, may utilize one or more functions or modules or units or operations described in patent application number U.S. Ser. No. 14/782,791 (which is Publication US 2016/0055490), which is hereby incorporated by reference in its entirety.

As a decentralized platform, the system enables other AI powered cyber intelligence providers to join the ecosystem Similar to the initial model as implemented, the AI powered cyber intelligence providers will gain access to the users' reports data on the blockchain. This will provide them with a valuable crowd-wisdom which they will be able to incorporate into their processes, data and value proposition. The AI powered cyber intelligence providers will save their scores on the blockchain in an encrypted format (that will not be revealed to other providers). The providers will then be able to offer their own subscription programs with their own guarantee programs to users. The providers will also be able to be Guarantee providers, and will then be liable for any claims made by users as part of their guarantee programs. Users will have the option to choose from the different subscription and guarantee programs that will be created by the AI powered cyber intelligence providers, when they subscribe as premium users. Subscription and payback for guarantee claims may be paid with the tokens and/or with other crypto-currency and/or with fiat currency and/or via other forms of payment (e.g., credit card, debit card, Electronic Funds Transfer (EFS), wire transfer, payment via a telephony provider or a cellular carrier, or the like). The decentralization of the AI and big-data provider source of data, will allow the ecosystem not to be dependent on a single AI powered cyber intelligence provider, will provide users with multiple guarantee program options, and will also allow different providers to cooperate and exchange scam related data, and provide joint alerts and guarantee programs to users.

Enforcement service providers: The platform may include a marketplace in which companies and enforcement service providers, meet and transact. For example, lawyers, attorneys, brand protection service providers, private agencies, governmental agencies, and/or other relevant entities will be able to sign up to be Enforcement service providers in the platform. The system may perform a detailed validation process and Know Your Customer (KYC) process for these providers. The providers will be required to pay for the validation process using tokens and/or via other payment methods. Companies and organizations who are interested in enforcing against scams identified in the ecosystem, will be able to publish work orders through the platform. Choosing the provider will be in the discretion of the company publishing the work order and can be in a form of bids by Enforcement providers, and/or selection based on published data. The information published in the platform about the Enforcement providers will include, for example, certifications, reviews of their previous work in the marketplace (provided by the companies that hired them), grading by the amount or number of tokens that they hold (e.g., which represents their involvement or stake in the ecosystem), etc.

The cryptocurrency token: as described above, the token may have several uses in the ecosystem of the present invention, for example: (a) Premium subscription or premium services—the token will be used to get the premium subscription of the application which will include a basic level of guarantee and the ability to gain from the bounties in cases where the user reports on potential online scams. (b) Guarantee programs—in addition to the basic guarantee program provided with the premium subscription, users will be able to use their tokens to buy additional guarantee programs for their online transactions. (c) Reports—users that are interested to report scam and be rewarded from the bounty will need to deposit tokens when they report. If they are found right, the deposit tokens will be returned to them in addition to their share in the bounty. If they are found incorrect, 80% of the tokens will be credited to the General bounty. (d) Bounties—the token will be used by and by companies and organizations to encourage users to report on potential online scams 20 percent (or other percentage) of the tokens paid by users for the premium subscription will be contributed to the general bounty. Companies and organizations will be able to create brand-specific bounties to encourage submission of scam reports or counterfeit product reports that are related specifically to their particular brand, or even to a particular product or item that they make or sell. (e) Paying and validating the Trust Stamp (or the authenticity stamp) and the Trusted Wallet Stamp (or the authentic crypto-wallet stamp)—companies and organizations that will be interested to gin getting the Trust Stamp and the Trusted Wallet Stamp will pay for the stamp using the tokens. For example, 50% of the tokens they pay will be paid to the public validation officers of their stamp, who can then use the tokens for premium subscriptions and guarantee programs (f) Subscription payment by companies and organizations to the system—companies and organizations that are interested in subscribing to the system and receiving anti-scam intelligence or information for reducing or mitigating the sale of counterfeit products and/or the publishing of false information, will be able to do so using the tokens. This use will be available at the time of the Token Generation Event (TGE). (g) Payment to enforcers—companies that will use the marketplace of enforcement services as part of the platform, will be able to pay enforcers for their action, with the tokens.

In a demonstrative embodiment, the token that may be used is an ERC-20 based token or crypto-currency or crypto-coin, having a suitable symbol (e.g., "MSLD"). In a demonstrative implementation, the system creates a pre-defined finite number of tokens, for example, 1,000,000,000 (one billion) tokens. There will be no inflation or additional creation of tokens.

In a demonstrative example, the generated tokens may be distributed and/or allocated and/or reserved and/or utilized in accordance with pre-defined ratios or quantities, such as:

| Entity: | Percentage: | Number of Tokens: |
|---|---|---|
| Founders, team and shareholders | 20% | 200,000,000 |
| Fund for future operations | 30% | 300,000,000 |
| Reporting Bounty | 4.5% | 45,000,000 |

-continued

| Entity: | Percentage: | Number of Tokens: |
|---|---|---|
| Marketing and bug reporting bounties | 0.5% | 5,000,0000 |
| Guarantee fund | 5% | 50,000,000 |
| Token offered to the public | 40% | 400,000,000 |
| Total | 100% | 1,000,000,000 |

Optionally, tokens distributed to the founders, team and shareholders, will be vested over a period of 1 year or other period, with 5% of them (e.g., 10 million tokens) distributed on the day of the token generation event (TGE). The fund for future operations is reserved to be used for future developments, maintenance of the system, marketing activities, etc. The Reporting Bounty will be the initial general bounty established by to encourage and reward users who report scam. The Guarantee Fund is a fund saved for cases in which users' claims for cases of scam on online items to which provided a guarantee. The tokens offered to the public will be sold in a pre-sale process which will be followed by a Token Sale. The public sale will not be offered to restricted persons or to entities and persons in the restricted jurisdictions. In some embodiments, the TGE or pre-sale may offer tokens as part of a public pre-sale with bonuses provided to early participants. Tokens may be purchased with certain types of other crypto-currency (e.g., Bitcoin, Ethereum) and/or with fiat currency.

The platform of the present invention may provide confidence to people performing online transactions. The cryptocurrency eco system is a demonstrative implementation of the present invention's Anti-Scam platform. In the cryptocurrency ecosystem the fear from scams is significant and is a daily challenge for all stakeholders including companies, token purchasers and wallet holders. The future growth of this new evolving world depends on enabling higher levels of trust to the basic element in the cryptocurrency ecosystem: exchanging value. The platform provides a rare Alignment of Interests between all stakeholders, companies and users alike. There is a need to assist the audience of end-users, and to bring onboard new users and to maintain the engagement of existing users. The confidence metrics of the platform are leveraged to be the "Stamp of Trust" of the ecosystem, and to lead all parts of the digital transactions and ecommerce.

The platform may address the need from the two sides of the value chain: (a) being End-User centric, targeted to the users and focusing improving engagement, with the token economy is the main tool; and also, (b) being Business centric: Expanding the adoption of a Trusted Partner Plan, the participation of companies in bounties, and the user of the Trusted Stamp and Trusted Wallet Stamp by companies and organizations.

The platform may operate based on the customer's full journey, from awareness to engagement and purchase of online items. Social effects: The application may be designed to have multiple elements that will support the planned network effects to make sure the distribution is rapid, viral, and impactful. The addition of each user to the network provides a benefit to the rest, as an additional user that can take part in reporting on potential scams benefits the rest of the community. Segmented marketing may be used, to segment the potential customers based on cryptocurrency personas including behavior, maturity in the market, previous online behavior, order of magnitude and/or complexity of the transactions explored by users, or the like. The platform may be marketed or implemented to achieve multiple marketing goals or aspects, for example: (a) Acquisition: From creating awareness to an active user; (b) Community: From onboarding to loyalty—supporting the community, growing engagement, expanding wallet share and usage frequency and retention; (c) Multiple acquisition channels leveraging the different products: Mobile, browser version, desktop, etc.; (d) being Business Centric (B2B) marketing plan guidelines: (d1) Target audience: Companies that would like to engage with their customers enroll their community to exchange trust and get rewarded; (d2) Trusted Partner program will be the umbrella under which companies will take part in the community and the token. The partner program will enable its members to select its level of engagement with different tools and services. The partner program will put focus on communicating the new service to all companies' users thus supporting the B2C marketing plan, creating awareness and effective Call To Action. (d3) Variety of services will enable to tailor the right solution, for example, Trust Stamp, Trusted Wallet Stamp, Bounty Program, or the like.

Some embodiments of the present invention provide a method comprising: (a) analyzing in combination at least (i) content of an online destination (or online venue) that sells an asset or provides information to a user, and/or (ii) data about ownership in said online destination (e.g., domain ownership data), and/or (iii) one or more crowd-sourced user submissions that flag said online destination as possibly fraudulent or possibly publishing false information; (b) based on the analyzing of step (a), determining that a content on said online destination, which sells said asset or provides said information, is false or fraudulent; wherein the method is performed automatically by a computerized apparatus. The present invention may utilize a unique combination analysis, that takes into account both AI processing of data (domain ownership; content displayed by the website or online venue; meta-data, such as the complexity or sophistication of the website; correctness or incorrectness of data shown on the website or venue, relative to formal data from a manufacturer of the product; or the like), as well as crowd-sourced data obtained from multiple user-submitted reports, optionally analyzed by detecting or determining a consensus based on pre-defined consensus rule(s). The present invention does not merely flag a website or a web-page as "suspicious" or "having a virus" or "having a malware"; but rather, flags a particular content-portion of a website as a content-portion that attempts to sell counterfeit goods or counterfeit products, or provides false or fake information. In some embodiments, for example, the system may protect a brand and/or products of a particular manufacturer; may receive in advance from such manufacturer a pre-defined and/or closed list or "white-list" of manufacturer-authorized distributors or resellers; and may compare the domain or URL or URI of an online venue which sells products of that manufacturer, to such pre-defined list or white-list; if the inspected online venue is not owned by an entity that is on that manufacturer-approved list of authorized resellers or authorized distributors, then the system of the present invention notifies the user or end-user or consumer that he is about to purchase a counterfeit product and/or that he is consuming false or fake information.

In some embodiments, the analyzing of step (a) comprises at least: (i) receiving a plurality of user-submitted reports that indicate that said online destination offers a fraudulent sale of one or more assets or contains false information; (ii) performing the determining of step (b) by taking into account at least a consensus that is detected among a crowd of users with regard to correctness of one or more of said user-submitted reports, based on a pre-defined rule that indicates one or more conditions for reaching consensus. For example, the system receives 50 user-submitted reports that indicate that a particular website sells counterfeit goods or publishes false or fake information, and 6 user-submitted reports indicating that the website or the venue is legitimate and/or sells authentic goods and/or publishes trustworthy information; the system determines that a pre-defined size of majority votes (e.g., 50 votes out of the 56 votes casted) indicate counterfeit assets and/or false information; and therefore, the system determines that a consensus was reached regarding such result, and notifies users according to the consensus reached.

In some embodiments, the method comprises: (i) determining that a particular online venue, that offers one or more assets for online purchase or that publishes information, is trustworthy; (ii) publishing into a publicly-accessible self-verifiable blockchain dataset an indication that said particular online venue is trustworthy. For example, each user-submitted report is written into the block-chain data-set; or, only the user-submitted reports that indicate trustworthiness; or, only the user-submitted reports that indicate non-trustworthiness; as well as meta-data such as (optionally) time and date of each such user-submission, the IP address of each submitter, a username or email address of the submitter, a unique identifier of each submitter, or the like.

In some embodiments, the method comprises: determining that said online venue, which offers for sale said asset, is legitimate; and providing to said user an indication that said online venue is authentic. For example, the system compares between (i) the ownership record in the domain that hosts a website that sells a product, and (ii) a white-list of authorized resellers of that product as provided in advance (or is obtained dynamically in real time) from the manufacturer or importer of that product. If a match is found, then a trustworthiness stamp or authenticity stamp or notification are generated and displayed, and optionally are stored in a block-chain data-set.

In some embodiments, the method comprises: determining that said online destination, which publishes said information, is a trustworthy destination; and providing to said user an indication that said online destination is trustworthy. For example, the system may receive from the CEO of a particular Company, a pre-defined or closed white-list of Facebook accounts, Twitter accounts, YouTube accounts, and authorized Blogging accounts, that were authorized by that Company to distribute information about that Company; the system then finds that a website or a social media account published information (negative, or positive) about the Company; the system compares between the publisher's data or meta-data, and the white-list provided by the Company (or, such white-list may be dynamically fetched in real time from a pre-defined resource locator or URL that is exclusively controlled by the Company; such as, "Company.com/White-List"). If the publisher's data matches at least one of the items on the white-list of entities or persons that are authorized to publish data regarding the Company, then a trustworthiness stamp or notification is generated. Otherwise, a False Information or "Fake News" notification or stamp is generated. Optionally, such notifications and/or stamps may be recorded or stored in a block-chain data-set. Accordingly, in some embodiments, the method comprises: determining that said online destination is fraudulent or non-trustworthy; and providing to said user an indication that said online destination is fraudulent or non-trustworthy. Similarly, in some embodiments, the method comprises:

providing to said user a notification that said user is about to purchase a counterfeit asset through said online destination.

In some embodiments, the method comprises: providing to said user a notification that said user is about to purchase an authentic asset through said online destination; and providing to said user a money-back guarantee that said asset is authentic. For example, further to such determination as described above, the system may provide to the user a warrantee or guarantee that the product is authentic, and that the user would get his money back if it turns out that a product that he bought from this authenticated website or venue turns out to be counterfeit.

In some embodiments, the method comprises: publishing through a block-chain data-set at least: (i) one or more user-submitted reports regarding authenticity of said online destination, and (ii) a stamp of approval regarding authenticity of said online destination. This may enable the public, or users, or premium users that receive an access code to the blockchain data-set, to autonomously search and/or check whether a particular online destination or venue is authentic and/or sells authentic products and/or publishes legitimate information. Similarly, in some embodiments, the method comprises: publishing through a block-chain data-set at least: (i) one or more user-submitted reports regarding non-authenticity of said online destination, and (ii) a stamp of disapproval regarding non-authenticity of said online destination.

In some embodiments, the method comprises: receiving a plurality of user-submitted reports regarding whether a particular email message is spam; determining a consensus among said plurality of user-submitted reports; publishing into a block-chain data-set at least one of: (i) said user-submitted reports, (ii) an indication of said consensus; providing a reward to at least one user that submitted a report that matches the consensus. This unique system provides a true and effective incentive to users to report spam emails, unlike conventional systems which depend on voluntary non-incentivized users. The system of the present invention would thus be able to collect a much larger amount of spam email or junk email reports from users, which in turn can be used by a spam analysis module or unit to determine consensus and/or to detect spam components or spam traces in the submitted emails, thereby improving the reliability of such spam filtering engine that operates in accordance with the present invention. Some embodiments may thus comprise a spam email/junk email detection system or filtering system, based on the above operations.

In some embodiments, the method comprises: receiving a plurality of user-submitted reports regarding whether a particular online venue is a phishing venue; determining a consensus among said plurality of user-submitted reports; publishing into a block-chain data-set at least one of: (i) said user-submitted reports, (ii) an indication of said consensus; providing a reward to at least one user that submitted a report that matches the consensus. This unique system provides a true and effective incentive to users to report phishing venues or sites or emails, unlike conventional systems which depend on voluntary non-incentivized users. The system of the present invention would thus be able to collect a much larger amount of phishing venues, which in turn can be used by a phishing analysis module or unit to determine consensus and/or to detect phishing components or phishing traces or phishing elements in the submitted venues or websites or web-pages, thereby improving the reliability of such phishing detection/filtering engine that operates in accordance with the present invention. Some embodiments may thus comprise a phishing detection system or filtering system, based on the above operations.

In some embodiments, the method comprises: receiving a plurality of user-submitted reports regarding whether a particular online venue sells counterfeit products; determining a consensus among said plurality of user-submitted reports; publishing into a block-chain data-set at least one of: (i) said user-submitted reports, (ii) an indication of said consensus; providing a reward to at least one user that submitted a report that matches the consensus. For example, if 60 users reported that a particular website sells fake or non-authentic shirts of a known manufacturer, whereas 4 users reported that the opposite; and optionally, taking into account also that the ownership in the domain of that particular websites is recorded on the name of an entity that is not within a pre-defined (or dynamically obtained) white-list of authorized retailers, wherein the white-list is provided by the manufacturer himself; then, the system generates a notification that the product offered for sale is counterfeit.

In some embodiments, the method comprises: providing to multiple users within an organization, a notification that a particular online venue sells one or more counterfeit assets of said organization or publishes false information about said organization. For example, a manufacturer of shoes employs 500 employees, and requests from the administrator of the system of the present invention to monitor Internet venues in order to detect counterfeit shoes that are being sold. The system of the present invention may optionally install a module or program in the laptop computers and/or smartphones and/or tablets and/or desktop computers of those 500 employees of the manufacturer, who may utilize such devices to surf the Internet and to perform electronic commerce transactions; and once some of them discover a suspicious website or online venue, such users (who are also employees of that manufacturer) may report it to the system. Optionally, a report about fake shoes sold at a particular website, may be assigned a greater weight or a greater score, relative to a similar report submitted by a non-employee user who is external to that organization (the shoes maker company). In some embodiments, such employees of the manufacturer's organization, who are familiar with the authentic products offered for sale by their company and/or who are loyal to the organization, may further be assigned the task of evaluating (or voting on) user-submitted reports that were submitted by non-employee users.

In some embodiments, the method comprises: (i) determining that a first entity which is the registered owner of said online destination; (ii) determining that a second, different, entity is the registered owner of a trademark in said asset that is offered for sale through said online destination; (iii) based on the first entity being different from the second entity, determining that an offer for sale of said asset on said online destination is fraudulent. For example, the system may detect, based on content analysis and/or based on user submissions, that the website "My-Best-Deals.com" offers for sale "Nike Air Shoes"; may further obtain or fetch the WHOIS record for that website, and find out that the domain is owned by "Tai Chang" of Beijing, China; may further check that name against a pre-defined white-list of authorized retailers or authorized distributors of Nike shoes, as provided to the system by the CEO of Nike company, or as obtained or downloaded automatically and/or in real-time from a pre-defined URL or resource locater of Nike company (e.g., from Nike.com/white-list), and/or may automatically check trademark ownership records (e.g., using the TESS database or USPTO trademark database or other databases) for the word "Nike" which appears in the product description; and may thus determine that the seller "Tai Chang" is not the trademark owner, nor is he an authorized reseller; thereby triggering a notification or warning that the offered item is fake or counterfeit.

In some embodiments, the method comprises: (i) determining a first price at which said online destination offers said asset for sale to said end-user; (ii) determining a second price which is a manufacturer suggested retail price (MSRP) of said asset; (iii) determining that the first price is smaller than the second price by at least N percent of the second price, wherein N is a pre-defined positive number; (iv) based on step (iii), determining that an offer for sale of said asset on said online destination is fraudulent. For example, the system may check the price of the item, based on its SKU number or serial number or model number or model name, in a pre-defined list of MSRP prices, and/or against the price of the item on a website or an online store that is known and is pre-defined on the system to be legitimately owned by the manufacturer (e.g., on "Nike,com" as being the official store of Nike company, when the sold item is "Nike Air Shoes"); or even at a particular e-commerce website that is known to be reliable and known to sell only non-fake items (e.g., Neuman Marcus website); the system may detect that the price of this particular shoes model on such authentic websites is $100, whereas the price on the website of "My-Best-Deals.com" is $37, and the difference in prices is greater than a predefined percentage value or ratio (e.g., the cheaper price is more than 33 percent cheaper, relative to the MSRP); thereby triggering a decision that the offered product on that website is counterfeit.

In some embodiments, the method comprises: (i) determining that a textual description of said asset on said online destination, has one or more discrepancies relative to a formal description of said asset by a manufacturer of said asset; (ii) based on step (i), determining that an offer for sale of said asset on said online destination is fraudulent. For example, in the scenario described above, the system may detect that "Nike Air Shoes" size 9, are shown on the manufacturer website as having weight of 2.5 pounds and having a shoebox of 12×10×8 inches; whereas the same shoes on the suspicious website are shown as having weight of 2.1 pounds and a shoebox having a different size (e.g., 9×11×13 inches); thereby triggering a decision that the offered product on that website is counterfeit. Similarly, in some embodiments, the method comprises: (i) determining that textual description of said asset on said online destination, has one or more different characteristics relative to a formal description of said asset by a manufacturer of said asset; wherein said characteristics comprise one or more of: size, dimensions, weight, color, materials used, quantity; (ii) based on step (i), determining that an offer for sale of said asset on said online destination is fraudulent.

In some embodiments, the determining of step (b) is also based on a determination that said online destination is owned by a particular entity that was already identified as an owner of another online destination that was determined to be fraudulent. For example, the system of the present invention has already detected or determined, that the website "My-Best-Nike.com" sells fake Nike shoes, and is owned by "Tai Chang" of Beijing, China; the system now examines the content and the ownership of the web-site "My-Best-Adidas.com" which sells shoes alleged to be Adidas shoes, and is also owned by that same person; and based on the prior determination that this person owns and/or operates the previously-mentioned website that sells fake Nike shoes, the system may proceed to also deduce and determine that the other website sells fake Adidas shoes.

This may be further corroborated by crowd-sourced data, such as, user submissions that reported that other website as possibly selling fake Adidas shoes.

In some embodiments, the method comprises: (i) receiving a plurality of user-submitted reports that indicate that said online destination offers a fraudulent sale of one or more assets or contains false information; wherein each user-submitted report is received, exclusively, via a submission mechanism that necessarily requires a cryptocurrency payment by a submitting user together with submitting his report; (ii) performing the determining of step (b) by taking into account at least a consensus that is detected among a crowd of users with regard to correctness of one or more of said user-submitted reports, based on a pre-defined rule that indicates one or more conditions for reaching consensus. For example, the submission of a user report about a website or online venue that sells counterfeit products and/or that publishes false or fake information, can be performed only if it is accompanied by such payment by the submitting user; thereby reducing the chances for fake or abusive user-reports, and increasing the correctness of the decisions reached by the system.

In some embodiments, the method comprises: (i) receiving a plurality of user-submitted reports that indicate that said online destination offers a fraudulent sale of one or more assets or contains false information; wherein each user-submitted report is received, exclusively, via a submission mechanism that necessarily requires a fiat payment by a submitting user together with submitting his report; (ii) performing the determining of step (b) by taking into account at least a consensus that is detected among a crowd of users with regard to correctness of one or more of said user-submitted reports, based on a pre-defined rule that indicates one or more conditions for reaching consensus. For example, the submission of a user report about a website or online venue that sells counterfeit products and/or that publishes false or fake information, can be performed only if it is accompanied by such payment by the submitting user; thereby reducing the chances for fake or abusive user-reports, and increasing the correctness of the decisions reached by the system.

In some embodiments, the method comprises: creating a bounty source from (at least) multiple fiat payments and/or cryptocurrency payments received together with multiple user-submitted reports; if a particular user-submitted report of a particular submitting-user is determined to be correct, then: distributing to said particular submitting-user a payment that is a portion of said bounty source, in an amount that is equal to or greater than the payment that said particular submitting-user had paid together with his user-report submission. For example, the submission of a user report about a website or online venue that sells counterfeit products and/or that publishes false or fake information, can be performed only if it is accompanied by such payment by the submitting user; thereby reducing the chances for fake or abusive user-reports, and increasing the correctness of the decisions reached by the system. Moreover, the Bounty mechanism provides an incentive for legitimate users to spend efforts, time, and their money (fiat or cryptocurrency) to submit a report, knowing that they would be rewarded if their report (for which they paid in order to submit it) is found to be correct.

In some embodiments, the method comprises: (i) analyzing content and meta-data of an online venue that receives cryptocurrency payments into a cryptocurrency wallet; and detecting a mismatch between (I) the actual identity of the real-life holder of said cryptocurrency wallet, and (II) the identity of the real-life owner of said online venue; (ii) based on said mismatch, notifying an end-user that said online venue, which receives cryptocurrency payments into said cryptocurrency wallet, is fraudulent. For example, the system may examine the website "My-Best-Coin.com" which publishes an ICO for a new coin, and requests payment into a particular crypto wallet; and may further obtain data that this particular crypto wallet is actually owned in real life by "Tai Ching", whereas that website is owned by "John Smith"; and the mismatch may (in some implementations) be sufficient to raise a possible-fraud flag and to notify the end-user that the crypto wallet may not necessarily belong to the true owner of that website or domain. In other embodiments, the system administrator may receive from the CEO of a particular Charity organization, the single official crypto-wallet (having a wallet identifier of #123456) of that Charity which is utilized by that Charity for the purpose of receiving anonymous donations in crypto-currency; and the system may then search and/or crawl the Internet and discover that a particular web-site, owned by "Jack Smith", solicits donations that allegedly would go to that particular Charity, but requests from end-users to send their crypto-currency donations to a crypto-wallet having identifier of #123789; and the mismatch indicates that this web-site or web-page, owned or operated by that "Jack Smith" (or even if the website ownership is unknown), contains a fraudulent crypto-wallet identifier that does not equal to the official crypto-wallet identifier of that particular Charity; and a fraud flag is triggered and raised towards the end-user who is considering to make her crypto-currency donation to that fake or fraudulent crypto-wallet. Similarly, in some embodiments, the method comprises: (i) analyzing content and meta-data of an online venue that receives cryptocurrency payments into a cryptocurrency wallet, by comparing said content and meta-data to at least one external source of information collected externally to said online venue; (ii) based on said mismatch, notifying an end-user that said online venue, which receives cryptocurrency payments into said cryptocurrency wallet, is fraudulent.

In some embodiments, the method comprises: (i) comparing between (i) content and meta-data of an online venue that provides to end-users a particular address of a crypto-currency wallet intended to receive crypto-currency payments from end-users, and (ii) at least one source of external information collected externally to said online venue; (ii) determining that the particular address of said crypto-currency wallet does not belong to a legitimate owner of products that are described on said online venue; (iii) generating a notification to at least one end-user, that said online venue comprises a fraudulent address of crypto-currency wallet. Similar to the previous scenario described above, some implementations may check and find out that the website "My-Best-Nike.com" allegedly sells "Nike Shoes" and provides a crypto-wallet identifier of #333444, allegedly being the crypto-wallet of an Authorized-Reseller of Nike company; however, a pre-defined list or white-list or lookup table may provide to the system of the present invention (e.g., by the CFO of Nike company) the list of identifiers of the only crypto-wallets that belong to authorized resellers of Nike products; and the lacking of crypto-wallet identifier #333444 from that white-list is utilized by the system to determine, and to notify the end-user, that this website is most probably a fake website or a website that sells fake or counterfeit products. Similarly, in some embodiments, the method comprises: (i) comparing between (I) content and meta-data of an online venue that provides to end-users a particular address of a crypto-currency wallet intended to receive crypto-currency payments from end-users, and (II) at least one source of external information collected externally to said online venue; (ii) determining that the particular address of said crypto-currency wallet belongs to a legitimate owner of products that are described on said online venue; (iii) generating a notification to at least one end-user, that said online venue comprises an authentic address of crypto-currency wallet of said legitimate owner.

In some embodiments, the method comprises: (i) receiving a plurality of user-submitted reports that indicate that said online destination offers a fraudulent sale of one or more assets; wherein each user-submitted report is received, exclusively, via a submission mechanism that necessarily requires a cryptocurrency payment by a submitting user together with submitting his report; (ii) performing the determining of step (b) by analyzing said plurality of user-submitted reports that were all submitted via said submission mechanism that necessarily requires cryptocurrency payment with each submission.

In some embodiments, the method comprises: (i) receiving a plurality of user-submitted reports that indicate that said online destination offers a fraudulent sale of one or more assets; wherein each user-submitted report is received, exclusively, via a submission mechanism that necessarily requires a cryptocurrency payment by a submitting user together with submitting his report; (ii) performing the determining of step (b) by taking into account at least a consensus reached among a crowd of end-users with regard to correctness of one or more of said user-submitted reports that were all submitted via said submission mechanism that necessarily requires cryptocurrency payment with each submission.

In some embodiments, the method comprises: (i) receiving a plurality of user-submitted reports that indicate that said online destination offers a fraudulent sale of one or more assets; wherein each user-submitted report is received, exclusively, via a submission mechanism that necessarily requires a cryptocurrency payment by a submitting user together with submitting his report; (ii) performing the determining of step (b) by analyzing said plurality of user-submitted reports that were all submitted via said submission mechanism that necessarily requires cryptocurrency payment with each submission; (iii) publishing at least one of said user-submitted report as a portion of a blockchain dataset whose authenticity is self-verifiable.

In some embodiments, the method comprises: (i) receiving a plurality of user-submitted reports that indicate that said online destination offers a fraudulent sale of one or more assets; wherein each user-submitted report is received, exclusively, via a submission mechanism that necessarily requires a cryptocurrency payment by a submitting user together with submitting his report; (ii) performing the determining of step (b) by analyzing said plurality of user-submitted reports that were all submitted via said submission mechanism that necessarily requires cryptocurrency payment with each submission; (iii) creating a bounty source from the multiple cryptocurrency payments received together with multiple user-submitted reports that indicate that said online destination offers a fraudulent sale of one or more assets; (iv) if a particular user-submitted report of a particular submitting-user is determined to be correct, then: distributing to said particular submitting-user a cryptocurrency payment that is a portion of said bounty source, in an amount that is equal to or greater than the cryptocurrency payment that said particular submitting-user had paid together with his user-report submission.

In some embodiments, the method comprises: (i) receiving a plurality of user-submitted reports that indicate that said online destination offers a fraudulent sale of one or more assets; wherein each user-submitted report is received, exclusively, via a submission mechanism that necessarily requires a cryptocurrency payment by a submitting user together with submitting his report; (ii) performing the determining of step (b) by analyzing said plurality of user-submitted reports that were all submitted via said submission mechanism that necessarily requires cryptocurrency payment with each submission; (iii) creating a bounty source from the multiple cryptocurrency payments received together with multiple user-submitted reports that indicate that said online destination offers a fraudulent sale of one or more assets; (iv) distributing at least a portion of said bounty source, among submitting-users that had submitted user-reports indicating that said online destination offers the fraudulent sale of one or more assets.

In some embodiments, the method comprises: (i) receiving a plurality of user-submitted reports that indicate that said online destination offers a fraudulent sale of one or more assets; wherein each user-submitted report is received, exclusively, via a submission mechanism that necessarily requires a fiat payment by a submitting user together with submitting his report; (ii) performing the determining of step (b) by analyzing said plurality of user-submitted reports that were all submitted via said submission mechanism that necessarily requires fiat payment with each submission.

In some embodiments, the method comprises: (i) receiving a plurality of user-submitted reports that indicate that said online destination offers a fraudulent sale of one or more assets; wherein each user-submitted report is received, exclusively, via a submission mechanism that necessarily requires a fiat payment by a submitting user together with submitting his report; (ii) performing the determining of step (b) by taking into account at least a consensus reached among a crowd of end-users with regard to correctness of one or more of said user-submitted reports that were all submitted via said submission mechanism that necessarily requires fiat payment with each submission.

In some embodiments, the method comprises: (i) receiving a plurality of user-submitted reports that indicate that said online destination offers a fraudulent sale of one or more assets; wherein each user-submitted report is received, exclusively, via a submission mechanism that necessarily requires a fiat payment by a submitting user together with submitting his report; (ii) performing the determining of step (b) by analyzing said plurality of user-submitted reports that were all submitted via said submission mechanism that necessarily requires fiat payment with each submission; (iii) publishing at least one of said user-submitted report as a portion of a blockchain dataset whose authenticity is self-verifiable.

In some embodiments, the method comprises: (i) receiving a plurality of user-submitted reports that indicate that said online destination offers a fraudulent sale of one or more assets; wherein each user-submitted report is received, exclusively, via a submission mechanism that necessarily requires a fiat payment by a submitting user together with submitting his report; (ii) performing the determining of step (b) by analyzing said plurality of user-submitted reports that were all submitted via said submission mechanism that necessarily requires fiat payment with each submission; (iii) creating a bounty source from the multiple cryptocurrency payments received together with multiple user-submitted reports that indicate that said online destination offers a fraudulent sale of one or more assets; (iv) if a particular user-submitted report of a particular submitting-user is determined to be correct, then: distributing to said particular submitting-user a fiat payment that is a portion of said bounty source, in an amount that is equal to or greater than the fiat payment that said particular submitting-user had paid together with his user-report submission.

In some embodiments, the method comprises: (i) receiving a plurality of user-submitted reports that indicate that said online destination offers a fraudulent sale of one or more assets; wherein each user-submitted report is received, exclusively, via a submission mechanism that necessarily requires a fiat payment by a submitting user together with submitting his report; (ii) performing the determining of step (b) by analyzing said plurality of user-submitted reports that were all submitted via said submission mechanism that necessarily requires fiat payment with each submission; (iii) creating a bounty source from the multiple cryptocurrency payments received together with multiple user-submitted reports that indicate that said online destination offers a fraudulent sale of one or more assets; (iv) distributing at least a portion of said bounty source, among submitting-users that had submitted user-reports indicating that said online destination offers the fraudulent sale of one or more assets.

In some embodiments, the method comprises: (i) determining that a particular online venue, that offers one or more assets for online purchase, is trustworthy; (ii) publishing into a publicly-accessible self-verifiable blockchain dataset an indication that said particular online venue is trustworthy.

In some embodiments, the method comprises: (i) generating a digital asset which is a crypto-currency token; and allocating said crypto-currency token to an end-user of an electronic device; (ii) generating an online mechanism that receives a user-report submission regarding a possibly-fraudulent online venue, conditioned upon that the user-report submission is performed together with payment of said crypto-currency token to a pre-defined recipient.

In some embodiments, the method comprises: (i) generating digital tokens of a crypto-currency; and distributing said digital tokens of crypto-currency to multiple end-user of an electronic device; (ii) receiving user-report submissions regarding a possibly-fraudulent online venue, conditioned upon that each user-report submission is performed together with payment of a digital token of said crypto-currency to a pre-defined recipient; (iii) generating a blockchain dataset that incorporates therein content and meta-data of said user-report submissions that were performed by each of said end-users together with data about respective payments.

In some embodiments, the method comprises: (i) generating digital tokens of a crypto-currency; and distributing said digital tokens of crypto-currency to multiple end-user of an electronic device; (ii) receiving user-report submissions regarding a possibly-fraudulent online venue, conditioned upon that each user-report submission is performed together with payment of a digital token of said crypto-currency to a pre-defined recipient; (iii) determining that a community consensus is reached with regard to correctness of one or more user-reports about said possible-fraudulent online venue; (iv) based at least on step (iii), generating a digital stamp of either approval or disapproval of said possible-fraudulent online venue; and publishing said digital stamp in a self-verifiable blockchain dataset that comprises also said user-reports.

In some embodiments, the method comprises: (i) generating digital tokens of a crypto-currency; and distributing said digital tokens of crypto-currency to multiple end-user of an electronic device; (ii) receiving user-report submissions regarding a possibly-fraudulent online venue, conditioned upon that each user-report submission is performed together with payment of a digital token of said crypto-currency to a pre-defined recipient; (iii) generating a guarantee fund that comprises at least a portion of said digital tokens that were paid to said pre-defined recipient together with user-report submissions; (iv) distributing at least a portion of said guarantee fund to a particular end-user that purchased an asset from said online venue which was subsequently determined to be fraudulent.

In some embodiments, the method comprises: (i) generating digital tokens of a crypto-currency; and distributing said digital tokens of crypto-currency to multiple end-user of an electronic device; (ii) receiving user-report submissions regarding a possibly-fraudulent online venue, conditioned upon that each user-report submission is performed together with payment of a digital token of said crypto-currency to a pre-defined recipient; (iii) distributing at least a portion of said digital tokens, that were paid to said pre-defined recipient together with user-report submissions, to a fraud-prevention enforcement entity that reviews content and meta-data online destinations and determine whether they are authentic or fraudulent.

In some embodiments, the method comprises: receiving N user-submitted reports indicating that a particular product that is sold in a particular online venue is counterfeit; receiving M user-submitted reports indicating that said particular product that is sold in said particular online venue is authentic; based on analysis that takes into account at least one additional parameter or data other than said N user-submitted reports and M user-submitted reports, determining that a consensus is that said particular product that is sold in said particular online venue is authentic; publishing into a block-chain data-set at least one of: (i) said N user-submitted reports, (ii) said M user-submitted reports, (iii) an indication of said consensus; providing a reward to at least one user that submitted at least one of said M user-submitted reports that said particular product is authentic.

In some embodiments, the method comprises: receiving N user-submitted reports indicating that a particular product that is sold in a particular online venue is counterfeit; receiving M user-submitted reports indicating that said particular product that is sold in said particular online venue is authentic; based on analysis that takes into account at least one additional parameter or data other than said N user-submitted reports and M user-submitted reports, determining that a consensus is that said particular product that is sold in said particular online venue is counterfeit; publishing into a block-chain data-set at least one of: (i) said N user-submitted reports, (ii) said M user-submitted reports, (iii) an indication of said consensus; providing a reward to at least one user that submitted at least one of said N user-submitted reports that said particular product is counterfeit.

In some embodiments, the method comprises: receiving N user-submitted reports indicating that a particular email message is spam; receiving M user-submitted reports indicating that said particular email message is non-spam; based on analysis that takes into account at least one additional parameter or data other than said N user-submitted reports and M user-submitted reports, determining that a consensus is that said particular email message is non-spam; publishing into a block-chain data-set at least one of: (i) said N user-submitted reports, (ii) said M user-submitted reports, (iii) an indication of said consensus; providing a reward to at least one user that submitted at least one of said M user-submitted reports that said particular email message is non-spam.

In some embodiments, the method comprises: receiving N user-submitted reports indicating that a particular email message is spam; receiving M user-submitted reports indicating that said particular email message is non-spam; based on analysis that takes into account at least one additional parameter or data other than said N user-submitted reports and M user-submitted reports, determining that a consensus is that said particular email message is spam; publishing into a block-chain data-set at least one of: (i) said N user-submitted reports, (ii) said M user-submitted reports, (iii) an indication of said consensus; providing a reward to at least one user that submitted at least one of said N user-submitted reports that said particular email message is spam.

In some embodiments, the method comprises: receiving N user-submitted reports indicating that a particular online venue is a phishing venue; receiving M user-submitted reports indicating that said particular online venue is a non-phishing venue; based on analysis that takes into account at least one additional parameter or data other than said N user-submitted reports and M user-submitted reports, determining that a consensus is that said particular online venue is a non-phishing venue; publishing into a block-chain data-set at least one of: (i) said N user-submitted reports, (ii) said M user-submitted reports, (iii) an indication of said consensus; providing a reward to at least one user that submitted at least one of said M user-submitted reports that said particular online venue is a non-phishing venue.

In some embodiments, the method comprises: receiving N user-submitted reports indicating that a particular online venue is a phishing venue; receiving M user-submitted reports indicating that said particular online venue is a non-phishing venue; based on analysis that takes into account at least one additional parameter or data other than said N user-submitted reports and M user-submitted reports, determining that a consensus is that said particular online venue is a phishing venue; publishing into a block-chain data-set at least one of: (i) said N user-submitted reports, (ii) said M user-submitted reports, (iii) an indication of said consensus; providing a reward to at least one user that submitted at least one of said N user-submitted reports that said particular online venue is a phishing venue.

In some implementations, the above-mentioned M and/or N may be a positive number, or a positive integer; or may be a number that is equal to or greater than zero; or may be an integer that is greater than or equal to zero. In some scenarios, M may be greater than N; in other scenarios, M may be smaller than N; in some scenarios, M may be equal to N. In some embodiments, the consensus is reached or determined in a manner that is not exclusively dependent on counting of votes (e.g., not exclusively based on whether M>N or N<M), but rather, based on at least one additional parameter or data-item or condition or rule, particularly based on the analysis of content served by said online venue (or the content of said email message, or the content of said candidate of phishing venue), and/or based on meta-data of such content, and/or based on data pertaining to domain ownership or website ownership, and/or based on data pertaining to description of the product on said website, and/or based on data obtained from an external data source (e.g., a manufacturer-provided white-list of authorized distributors or authorized resellers; a database of trademarks and their respective owners; a list or a white-list of authorized or legitimate entities or venues that are legitimately owned by or associated with an organization or a brand; or the like). In some embodiments, the publishing or the storing of data into a block-chain data-set may be an optional step, and the data may be stored in a private database, or in a private database that may allow selective access to certain users and/or to the public (e.g., upon payment of a subscription fee, or a per-query fee, or other fee).

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules. The system(s) of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, rearrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:
   (a) analyzing in combination at least
      (i) content of an online destination, accessed by user electronic devices, that sells an asset or provides information to a user, and (ii) data about ownership in said online destination, the analyzing being performed by one of the user electronic devices and/or by a remote server, and collecting, at the remote server, from the user electronic devices, a plurality of genuine product votes or fraudulent product votes, that indicate that a particular product or service is or may be fraudulent;

aggregating, at the remote server, submissions or votes, by using a weighting mechanism, based on the aggregated data, generating, at the one of the user electronic devices and/or the remote server, a possibly fraudulent risk score, which is used by a warning module to inform users about a possible risk of a fraudulent product or fraudulent service, by performing, at the one of the user electronic devices and/or the remote server, an automatic risk analysis that is based on an online brand protection system that utilizes an artificial intelligence (AI) engine, that analyzes different web metrics of the online destination accessed by the user electronic devices to indicate a potential risk score for an online item being analyzed, and to determine if a product or service that is offered for sale is more-probably genuine or fraudulent, wherein said web metrics that are analysed include at least some of:

content, keywords, web-page elements, search engine optimization (SEO) data, domain names in all top-level domains (TLDs), a use of the brand name or a variation of the brand name or a typographical error of the brand name in a domain name), hosting provider, domain name server (DNS)

data, registrar data, traffic analytics, search engine results, technologies and structures of the website or application, meta-tags and coding utilized, programming languages used, use of logo or copyrighted pictures or trademarks, inbound and outbound links, engagement in social media, linking from the website to social media or vice versa, and amount and types of listings of a seller on a marketplace; and (b) based on the analyzing of step (a), determining, at the one of the user electronic devices and/or the remote server, that a content on said online destination, which sells said asset or provides said information, is false or fraudulent.

2. The method of claim 1, further comprising:

providing to said user a notification that said user is about to purchase a counterfeit asset through said online destination.

3. The method of claim 1, further comprising:

providing to said user a notification that said user is about to purchase an authentic asset through said online destination; and providing to said user a money-back guarantee that said asset is authentic.

4. The method of claim 1, further comprising:

publishing into a block-chain data-set at least one of: (i) said user-submitted reports, (ii) an indication of said consensus;

providing a reward to at least one user that submitted a report that matches the consensus.

5. The method of claim 1, wherein the analyzing of step (a) analyzes content of an online destination that sells an asset, and comprises:

(i) determining that a first entity which is the registered owner of said online destination;

(ii) determining that a second, different, entity is the registered owner of a trademark in said asset that is offered for sale through said online destination;

(iii) based on the first entity being different from the second entity, determining that an offer for sale of said asset on said online destination is fraudulent.

6. The method of claim 1, wherein the analyzing of step (a) analyzes content of an online destination that sells an asset, and comprises at least:

(i) determining a first price at which said online destination offers said asset for sale to said end-user;

(ii) determining a second price which is a manufacturer suggested retail price (MSRP) of said asset;

(iii) determining that the first price is smaller than the second price by at least N percent of the second price, wherein N is a pre-defined positive number;

(iv) based on step (iii), determining that an offer for sale of said asset on said online destination is fraudulent.

7. The method of claim 6, wherein the analyzing of step (a) analyzes content of an online destination that sells an asset, and comprises at least:

(i) determining that a textual description of said asset on said online destination, has one or more discrepancies relative to a formal description of said asset by a manufacturer of said asset;

(ii) based on step (i), determining that an offer for sale of said asset on said online destination is fraudulent.

8. The method of claim 1, wherein the analyzing of step (a) analyzes content of an online destination that sells an asset, and comprises at least:

(i) determining that textual description of said asset on said online destination, has one or more different characteristics relative to a formal description of said asset by a manufacturer of said asset; wherein said characteristics comprise one or more of: size, dimensions, weight, color, materials used, quantity;

(ii) based on step (i), determining that an offer for sale of said asset on said online destination is fraudulent.

9. The method of claim 1, wherein the determining of step (b) is also based on a determination that said online destination is owned by a particular entity that was already identified as an owner of another online destination that was determined to be fraudulent.

10. The method of claim 9, wherein the analyzing of step (a) comprises at least:

(i) receiving a plurality of user-submitted reports that indicate that said online destination offers a fraudulent sale of one or more assets or contains false information;

wherein each user-submitted report is received, exclusively, via a submission mechanism that necessarily requires a cryptocurrency payment by a submitting user together with submitting his report;

(ii) performing the determining of step (b) by taking into account at least a consensus that is detected among a crowd of users with regard to correctness of one or more of said user-submitted reports, based on a pre-defined rule that indicates one or more conditions for reaching consensus.

11. The method of claim 1, comprising:

creating a bounty source from multiple payments received together with multiple user-submitted reports;

if a particular user-submitted report of a particular submitting-user is determined to be correct, then: distributing to said particular submitting-user a payment that is a portion of said bounty source, in an amount that is equal to or greater than the payment that said particular submitting-user had paid together with his user-report submission.

12. The method of claim 1, comprising:

(i) analyzing content and meta-data of an online venue that receives cryptocurrency payments into a cryptocurrency wallet; and detecting a mismatch between (I) the actual identity of the real-life holder of said cryptocurrency wallet, and (II) the identity of the real-life owner of said online venue;

(ii) based on said mismatch, notifying an end-user that said online venue, which receives cryptocurrency payments into said cryptocurrency wallet, is fraudulent.

13. The method of claim 1, comprising:

publishing into a block-chain data-set at least one of: (i) said N user-submitted reports, (ii) said M user-submitted reports, (iii) an indication of said consensus;

providing a reward to: at least one user that submitted at least one of said M user-submitted reports that said particular product is authentic, or, to at least one user that submitted at least one of said N user-submitted reports that said particular product is counterfeit.

14. A system, comprising a remote server, configured to:

(a) analyze in combination at least i) content of an online destination, accessed by user electronic devices, that sells an asset or provides information to a user, and (ii) data about ownership in said online destination, the analyzing being performed by the remote server, and collect, at the remote server, from the user electronic devices, a plurality of genuine product votes or fraudulent product votes, that indicate that a particular product or service is or may be fraudulent;

aggregate, at the remote server, submissions or votes, by using a weighting mechanism, based on the aggregated data, generate, at the remote server, a possibly fraudulent risk score, which is used by a warning module to inform users about a possible risk of a fraudulent product or fraudulent service, by performing, at the remote server, an automatic risk analysis that is based on an online brand protection system that utilizes an artificial intelligence (AI) engine, that analyzes different web metrics of the online destination accessed by the user electronic devices to indicate a potential risk score for an online item being analyzed, and to determine if a product or service that is offered for sale is more-probably genuine or fraudulent, wherein said web metrics that are analysed include at least some of:

content, keywords, web-page elements, search engine optimization (SEO) data, domain names in all top-level domains (TLDs), a use of the brand name or a variation of the brand name or a typographical error of the brand name in a domain name), hosting provider, domain name server (DNS) data, registrar data, traffic analytics, search engine results, technologies and structures of the website or application, meta-tags and coding utilized, programming languages used, use of logo or copyrighted pictures or trademarks, inbound and outbound links, engagement in social media, linking from the website to social media or vice versa, and amount and types of listings of a seller on a marketplace; and (b) based on the analyzing of step (a), determine, at the remote server, that a content on said online destination, which sells said asset or provides said information, is false or fraudulent.

15. A computer program product comprising at least one computer readable non-transitory storage medium containing program instructions, which program instructions when read by processing circuitry of a remote server, cause the processing circuitry to perform a method comprising:

(a) analyzing in combination at least (i) content of an online destination, accessed by user electronic devices, that sells an asset or provides information to a user, and (ii) data about ownership in said online destination, the analyzing being performed by the remote server, and collecting, at the remote server, from the user electronic devices, a plurality of genuine product votes or fraudulent product votes, that indicate that a particular product or service is or may be fraudulent;

aggregating, at the remote server, submissions or votes, by using a weighting mechanism, based on the aggregated data, generating, at the remote server, a possibly fraudulent risk score, which is used by a warning module to inform users about a possible risk of a fraudulent product or fraudulent service, by performing, at the remote server, an automatic risk analysis that is based on an online brand protection system that utilizes an artificial intelligence (AI) engine, that analyzes different web metrics of the online destination accessed by the user electronic devices to indicate a potential risk score for an online item being analyzed, and to determine if a product or service that is offered for sale is more-probably genuine or fraudulent, wherein said web metrics that are analysed include at least some of:

content, keywords, web-page elements, search engine optimization (SEO) data, domain names in all top-level domains (TLDs), a use of the brand name or a variation of the brand name or a typographical error of the brand name in a domain name), hosting provider, domain name server (DNS) data, registrar data, traffic analytics, search engine results, technologies and structures of the website or application, meta-tags and coding utilized, programming languages used, use of logo or copyrighted pictures or trademarks, inbound and outbound links, engagement in social media, linking from the website to social media or vice versa, and amount and types of listings of a seller on a marketplace; and (b) based on the analyzing of step (a), determining, at the remote server, that a content on said online destination, which sells said asset or provides said information, is false or fraudulent.

* * * * *